(12) United States Patent
Rahat et al.

(10) Patent No.: US 10,952,104 B2
(45) Date of Patent: Mar. 16, 2021

(54) METHODS AND SYSTEMS FOR CELLULAR-PREFERRED LOGIC FOR MOBILE DEVICES

(71) Applicant: T-Mobile USA, Inc., Bellevue, WA (US)

(72) Inventors: Adnan Rahat, Renton, WA (US); Nayla Hamade, Kirkland, WA (US); Gunjan Nimbavikar, Bellevue, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/293,948

(22) Filed: Mar. 6, 2019

(65) Prior Publication Data
US 2019/0281507 A1     Sep. 12, 2019

Related U.S. Application Data

(60) Provisional application No. 62/641,831, filed on Mar. 12, 2018.

(51) Int. Cl.
*H04W 36/00* (2009.01)
*H04W 36/14* (2009.01)
(Continued)

(52) U.S. Cl.
CPC ...... *H04W 36/0022* (2013.01); *H04B 17/309* (2015.01); *H04W 36/0027* (2013.01);
(Continued)

(58) Field of Classification Search
CPC ......... H04W 36/0022; H04W 36/0027; H04W 36/0069; H04W 36/14; H04W 36/26;
(Continued)

(56) References Cited

U.S. PATENT DOCUMENTS

2007/0008928 A1\* 1/2007 Kezys .................. H04W 36/18
370/331
2012/0077488 A1 3/2012 Unger et al.
(Continued)

FOREIGN PATENT DOCUMENTS

WO    WO2015184418 A1    12/2015

OTHER PUBLICATIONS

PCT Search Report and Written Opinion dated Jun. 28, 2019 for PCT Application No. PCT/US2019/021548, 12 pages.

*Primary Examiner* — Jay P Patel
(74) *Attorney, Agent, or Firm* — Lee & Hayes, P.C.

(57) ABSTRACT

Systems and methods for a user equipment operating in a cellular-preferred mode are disclosed. A user equipment operating in a cellular-preferred mode includes a connection priority order that prefers to connect to a licensed cellular network, if available, before connecting to an unlicensed wireless network. Signal quality thresholds for a connection by a user device to licensed cellular networks and unlicensed wireless networks are selected allowing the user equipment to transfer its connection between a licensed cellular network and an unlicensed wireless network without dropping calls. A user interface provides information to alert a user from inadvertently roaming into a licensed cellular network and incurring additional unnecessary changes. By identifying available licensed cellular networks and unlicensed wireless networks, the user interface allows a user to update the priority order connection preference or to override the selected priority order for connection to a licensed cellular network or an unlicensed wireless network.

20 Claims, 13 Drawing Sheets

(51) Int. Cl.
  *H04W 36/26* (2009.01)
  *H04W 36/30* (2009.01)
  *H04B 17/309* (2015.01)
  *H04W 36/18* (2009.01)
  *H04W 68/00* (2009.01)

(52) U.S. Cl.
  CPC ... *H04W 36/0069* (2018.08); *H04W 36/0085* (2018.08); *H04W 36/14* (2013.01); *H04W 36/18* (2013.01); *H04W 36/26* (2013.01); *H04W 36/30* (2013.01); *H04W 68/005* (2013.01)

(58) Field of Classification Search
  CPC . H04W 36/30; H04W 36/0085; H04W 36/18; H04W 68/005; H04B 17/309; H04B 17/318
  See application file for complete search history.

(56) References Cited

U.S. PATENT DOCUMENTS

| | | | |
|---|---|---|---|
| 2012/0099562 A1* | 4/2012 | Smadi | H04W 36/0083 370/332 |
| 2012/0230304 A1* | 9/2012 | Barbu | H04W 48/18 370/338 |
| 2012/0230305 A1* | 9/2012 | Barbu | H04W 72/085 370/338 |
| 2014/0220967 A1 | 8/2014 | Pankajakshan et al. | |
| 2015/0117425 A1* | 4/2015 | Gupta | H04W 72/0486 370/338 |
| 2015/0172986 A1* | 6/2015 | Salkintzis | H04W 36/36 455/436 |
| 2015/0208280 A1* | 7/2015 | Lorca Hernando | H04W 28/08 370/235 |
| 2015/0282013 A1* | 10/2015 | Kim | H04W 24/10 370/331 |
| 2015/0358893 A1* | 12/2015 | Laselva | H04W 48/14 370/329 |
| 2016/0135144 A1* | 5/2016 | Tsai | H04W 52/0258 455/553.1 |
| 2016/0227578 A1 | 8/2016 | Lee et al. | |
| 2017/0013510 A1* | 1/2017 | Jung | H04W 48/10 |
| 2017/0019835 A1* | 1/2017 | Lee | H04W 48/14 |
| 2017/0078959 A1* | 3/2017 | Enomoto | H04W 76/16 |
| 2017/0086089 A1* | 3/2017 | Lee | H04W 28/02 |
| 2017/0181070 A1* | 6/2017 | Gupta | H04W 48/18 |
| 2017/0195908 A1* | 7/2017 | Lee | H04W 28/085 |
| 2017/0231020 A1* | 8/2017 | Tomici | H04L 63/0281 |
| 2018/0070288 A1* | 3/2018 | Kim | H04W 36/0016 |
| 2019/0116540 A1* | 4/2019 | Faus Gregori | H04W 36/36 |
| 2019/0124559 A1* | 4/2019 | Brown | H04W 36/0085 |
| 2019/0274082 A1* | 9/2019 | Vemuri | H04M 7/0057 |

* cited by examiner

METHODS AND SYSTEMS FOR CELLULAR-PREFERRED LOGIC FOR MOBILE DEVICES

CROSS REFERENCE TO RELATED APPLICATIONS

This application claims benefit of U.S. Provisional Application No. 62/641,831, filed Mar. 12, 2018, entitled "WiFi Calling—Cellular Preferred Logic," which is incorporated herein by reference in its entirety.

BACKGROUND

Wireless mobile communication devices such as smartphones, tablet computers, wearable devices, and the like are widely used and carried by consumers. These devices typically connect to licensed cellular networks or unlicensed wireless networks. Some wireless mobile devices allow a user to select a preference for calling, such as Wi-Fi Preferred, Cellular Preferred, or Wi-Fi Only. A Wi-Fi Preferred connection makes all calls over an available unlicensed Wi-Fi Network, or over a licensed cellular network if no Wi-Fi network is available. A Cellular Preferred connection makes all calls over an available cellular network, and only makes calls over an available Wi-Fi network if no cellular network is available. A Wi-Fi Only connection makes all calls over an available Wi-Fi network, and does not connect calls over a licensed cellular network if there are no available Wi-Fi networks.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
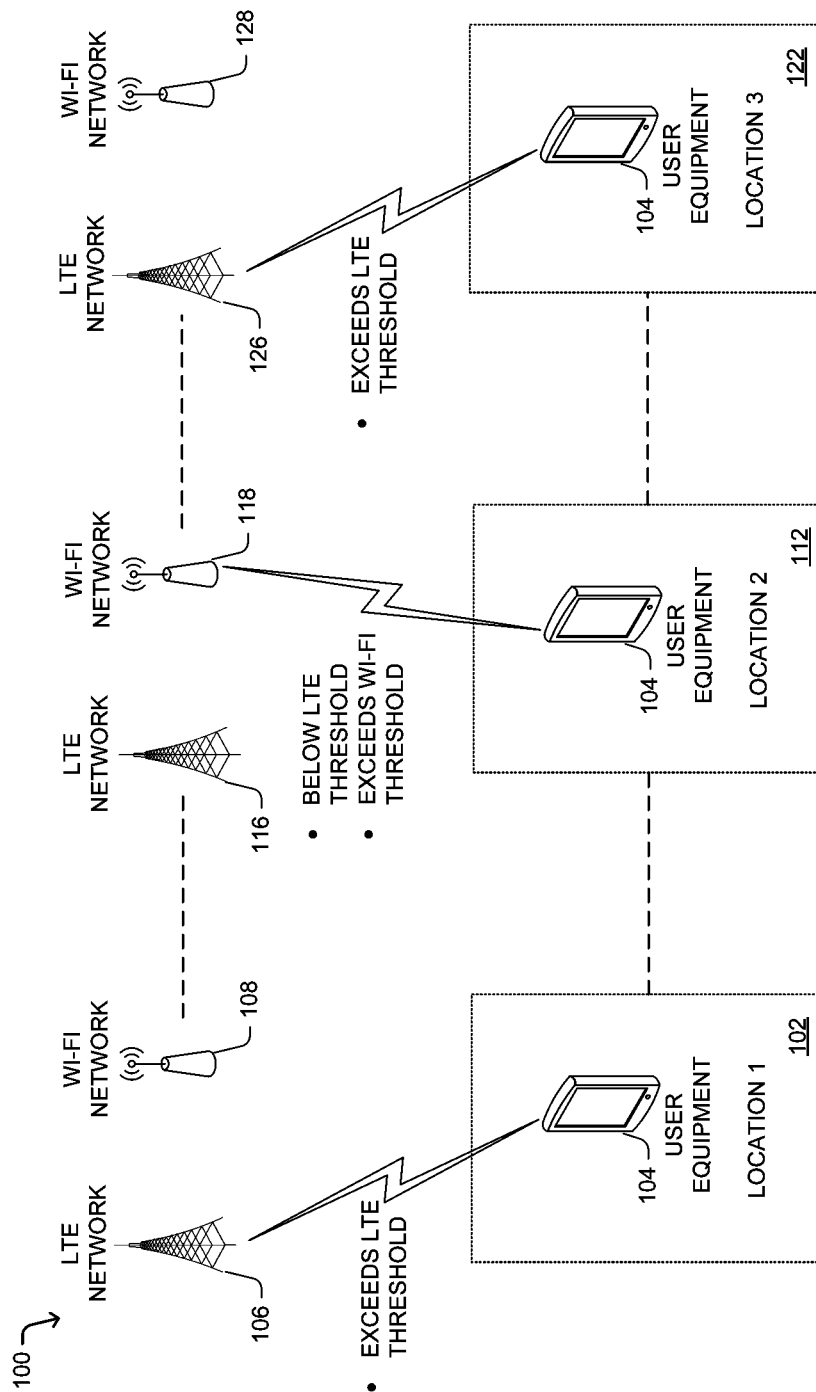
FIG. 1 is an environment illustrating wireless communication connection between a user equipment and a LTE network or a Wi-Fi network at three different locations. In this example, the user equipment is associated with a cellular preferred connection. The user equipment at location 1 is connected to a licensed wireless LTE network. Upon moving to location 2, the user equipment connects to an unlicensed Wi-Fi network because the signal quality of the licensed LTE network is below an acceptable threshold. Thereafter, upon moving to location 3, the user equipment connects to a licensed wireless LTE network whose signal quality exceeds an acceptable threshold.

Described herein are technologies for systems and methods for a user equipment to be configured to prefer a connection to a licensed cellular network, and to connect to available unlicensed wireless connections (such as an unlicensed Wi-Fi network) when needed or requested by the user of the user equipment. The preference may be specified by a priority order for connecting a user equipment to one or more licensed cellular networks and to one or more unlicensed wireless networks. The priority order may configure the user equipment to connect to any one of the one or more licensed cellular networks before connecting to any one of the one or more unlicensed wireless networks. The priority order may also be updated to connect to an unlicensed wireless network before connecting to licensed cellular networks.

In some examples, a priority order preference for licensed cellular connections may enhance voice calling because Voice over LTE (VoLTE) may provide better call quality and customer experience than unlicensed Wi-Fi networks. In other examples, a user who prefers cellular calling may roam to a licensed cellular network, without being aware of the possibility of incurring additional charges. To alert the user of potential additional charges when roaming, the user equipment may be notified that an unlicensed Wi-Fi network is available for connection. A user may prefer using unlicensed Wi-Fi networks for various reasons, including reducing unexpected licensed cellular charges while roaming.

In one example, a user selects a preference for cellular communications for a user equipment through a priority order whereby the user equipment connects to an available licensed cellular network, and connect to an unlicensed wireless network when no licensed cellular network is available. Example user equipment include cellular telephones, smart phones, computers with cellular and Wi-Fi capability (such as tablet computers, computers, smartwatches, etc.), smart watches, and other mobile devices with licensed cellular and unlicensed Wi-Fi capability. After receiving a selection for a priority order preference for a licensed cellular network, a user equipment may attempt to connect to a licensed cellular network such as a Long-Term Evolution (LTE) network or a 5G network, if such licensed cellular network is available. In a cellular-preferred mode, the user equipment remains connected to the licensed network until a signal quality metric for that licensed network (e.g., LTE or 5G) falls below a threshold. In one example, Reference Signal Received Quality (RSRQ) may be chosen as the signal quality metric, and an RSRQ threshold may be selected for determination. For example, a Reference Signal Received Power (RSRP) threshold may be chosen to be a substantially low value (such as −115 dBm) allowing the user equipment to remain connected to the licensed network so long as the measured RSRP value is greater than −115 dBm threshold, and otherwise, the user equipment attempts to connect to an unlicensed wireless network if the measured RSRP value falls below the −115 dBm threshold. Upon connecting to an unlicensed wireless network, the user equipment will remain connected to the unlicensed wireless network until the signal quality metric (e.g., RSRP) of an available network (e.g., LTE or 5G) exceeds the selected threshold (e.g., −115 dBm). Of course, the example threshold value is not intended to be limiting, and other thresholds and signal quality metrics are contemplated herein.

In an example, the user equipment remains connected to a licensed cellular network so long as the signal quality of the licensed cellular network exceeds a chosen signal quality threshold. The signal quality threshold may be chosen sufficiently low so that call quality may be maintained during handover of the call from the licensed cellular network to the unlicensed wireless network. If the signal quality threshold is chosen too low, and the call quality is poor, the communication session of the user equipment may compromise the call and user experience before the user equipment connects to an unlicensed network. In another example, the call may be dropped completely prohibiting a connection to an unlicensed wireless network.

In other examples, the RSRP threshold value may be selected from the range of −85 dBm to −150 dBm. Other example signal quality metrics include Received Signal Code Power (RSCP) and Relative Received Signal Strength (RSSI). The unlicensed wireless network may be any type of unlicensed network, including Wi-Fi, other IEEE 802.11-based technologies and its progeny (e.g., Wi-Fi), IEEE 802.15-based technologies and its progeny (e.g., Zigbee, Bluetooth, Low-Rate Wireless Personal Area Networks, Wireless HART, MiWi), IEEE 802.16-based technologies (WiMAX), WLAN, near-field communications, and infrared communications.

In an example, a user equipment operating in a cellular-preferred connection mode may connect to a licensed UMTS network rather than to an LTE network. In an example, a user equipment remains connected to the UMTS network until a signal quality metric falls below a signal quality threshold. In an example using RSCP as the signal quality metric for the licensed UMTS network, the user equipment may remain connected to the licensed UMTS network while the measured RSCP value falls exceeds the −115 dBm threshold, and if the RSCP value falls below the −115 dBm threshold, the uses equipment will attempt to connect to an unlicensed wireless network, if available. Once connected, the user equipment remains connected to the unlicensed wireless network until the signal quality metric for a licensed cellular network exceeds a threshold, causing the user equipment to attempt to connect to the UMTS network. In other examples, the RSCP threshold may be selected from the range of −85 dBm to −150 dBm. In an example, RSSI may be chosen as the signal quality metric. In another example, the user equipment may connect to a licensed LTE cellular network, if available.

In an example, a user equipment operating in a cellular-preferred mode may connect to a licensed Global Systems for Mobile Communications (GSM) network, rather than to a licensed LTE or UMTS network. In an example, a user equipment remains connected to the licensed GSM network until a signal quality metric for the GSM network falls below a threshold. RSSI may be chosen as the signal quality metric in one example, permitting a user equipment operating in a cellular-preferred mode to remain connected to the GSM network until the measured RSSI value falls below a −98 dBm threshold, causing the user equipment to attempt to connect to an unlicensed wireless network, if available. After connecting to an unlicensed wireless network, the user equipment remains connected to the unlicensed wireless network until the RSSI value exceeds a signal quality threshold, and if so, the user equipment attempts to connect to the GSM network.

In is understood that a licensed LTE system is also compatible with licensed UMTS, GSM, and/or 5G networks. In an example, a user equipment operating in a cellular-preferred mode may attempt to connect to a licensed cellular network in the following priority order: attempt to connect first to a licensed LTE licensed network, second, to a licensed UMTS licensed network, third, to a licensed GSM licensed network, fourth, to a licensed 5G network, and so on. In an example, the user may select a cellular preferred priority for a user equipment to be limited to LTE (or 5G) licensed networks, preventing the user equipment from connecting to UMTS, GSM, 5G, and/or LTE licensed networks. In an example, the user may select a cellular preferred priority for a user equipment to be limited to LTE, 5G, and UMTS licensed networks, but not GSM licensed networks. In an example, the user may select a cellular preferred priority for a user equipment to connect to any available LTE, 5G, UMTS, and GSM licensed cellular networks.

In an example, a user equipment operating in a cellular preferred mode may enter a location outside the coverage area of its home subscriber or Home Public Land Mobile Number (H-PLMN) network. In this case, the user equipment may be in a roaming connection to another cellular network. In an example, user equipment may roam from a H-PLMN to a Visited Public Land Mobile Network (V-PLMN). Roaming to a V-PLMN network may result in the user incurring additional charges associated with the roaming to a network different from the associated H-PLMN network. In an example, when roaming to a V-PLMN network, a user may prefer to change its connection from a licensed cellular network to an unlicensed wireless network, to, for example, reduce roaming network charges. To enable a user to override a cellular preferred mode, in one example, the user may be presented with a message screen informing that the user equipment is roaming into the network coverage of an unregistered network (V-PLMN). The message screen may also inform the user if additional charges associated with the roaming. The message screen may also display a query relating to whether the user wishes to remain on the V-PLMN licensed network, or chooses to connect to an unlicensed network, if available. The user may input an updated priority order to change or overwrite the priority order for connection to a licensed cellular network or an unlicensed wireless network.

In an example, a user equipment connected to an unlicensed wireless network while roaming to a V-PLMN network may wish to connect to an available H-PLMN network. In an example, upon entering the wireless coverage area of the H-PLMN, the user equipment may receive a message informing the user equipment that it is within H-PLMN coverage. The user equipment may also receive a message querying whether the user equipment should remain connected to an unlicensed wireless network or should connect to the licensed H-PLMN network. In an example, the user equipment may automatically connect to the H-PLMN network, if available, rather than requesting user input to do so.

The techniques and systems described herein provide numerous improvements to the operation of the user equipment. For example, the disclosed systems and methods provide a user equipment that can choose to prefer a connection to a licensed cellular network, and connect to an unlicensed network before the signal quality of the network connection. Transitioning a call from a licensed cellular network to a wireless network connection before the signal quality of the licensed cellular connection degrades to a level where the call would be dropped allows calls to be seamlessly transitioned from a licensed cellular network to an unlicensed cellular network.

The disclosed methods and systems provide an interface that informs a user of a user equipment as the user equipment moves from the coverage of a H-PLMN network to a V-PLMN network. When roaming into a V-PLMN network, a user of a user device may incur additional charges associated with roaming. By informing the user of an available unlicensed network, the user may be able to eliminate these additional roaming charges.

The disclosed systems and methods may be implemented in a number of ways. Example implementations are provided below with reference to the following figures.

FIG. 1 illustrates example environment 100 for user equipment 104 connecting to licensed cellular services or unlicensed wireless services. User equipment 104 in FIG. 1 is operating in a cellular-preferred mode. In a cellular-preferred mode, the user equipment may be associated with a priority order for connecting to a licensed cellular network, if available while the signal quality exceeds a signal quality threshold for the licensed cellular network, and if the signal quality of the licensed cellular network falls below the signal quality threshold, the user equipment connects to an unlicensed wireless network.

Box 102 depicts a user equipment 104 operating in a cellular-preferred mode and positioned at location 1. In this example, both licensed cellular network 106 and an unlicensed Wi-Fi network 108 are available for connection to user equipment 104. Because user equipment 104 is operating in a cellular preferred mode, user equipment 104 attempts to connect to an available, licensed LTE network 106, rather than to an unlicensed Wi-Fi network 108. In this example, the signal quality of the LTE network 106 exceeds a signal quality threshold, and therefore the user equipment connects to the licensed LTE network 106.

Box 112 depicts a user equipment 104 operating in a cellular-preferred mode and positioned at location 2. The user equipment connects to a licensed cellular network or an unlicensed wireless network based on a priority order. At this location, because the signal strength of the licensed cellular network 116 is below a signal quality threshold of a connection with the licensed cellular network, the cellular-preferred user equipment 104 attempts to connect to unlicensed wireless network 118. In the example, depicted in the middle portion of FIG. 1, the signal quality of the connection with unlicensed wireless network exceeds a signal quality threshold for the unlicensed wireless network, allowing the user equipment 104 to connect to unlicensed Wi-Fi network 118.

Box 122 depicts a user equipment 104 operating in a cellular-preferred mode and positioned at location 3. At this location, the signal strength of the connection with licensed LTE cellular network 126 exceeds the signal quality threshold for the licensed LTE cellular network, causing the user equipment 104 to connect to licensed LTE cellular network 126 rather than to unlicensed wireless access point 118.

As shown in FIG. 1, based on its priority order, a user equipment operating in a cellular-preferred mode attempts to connect to a licensed cellular network, if available and the signal quality of the available cellular network exceeds a signal quality threshold. If the signal quality threshold of a connection with an available LTE cellular network is less than a signal quality threshold and the signal quality of a connection to an available unlicensed wireless network exceeds a signal quality threshold for the unlicensed network, the user equipment connects to the unlicensed wireless network. In one example, the user equipment remains connected to the unlicensed network until the signal quality of an available licensed cellular network exceeds a signal quality threshold for a licensed cellular network.

In an example, licensed cellular networks 106, 116, and 126 may be the same licensed cellular networks. In an example, licensed cellular networks 106, 116, and 126 may be different licensed cellular networks. In an example, two or more of the licensed cellular networks may be the same cellular network. In an example, two or more of the licensed cellular networks may be different cellular networks.

In an example, unlicensed wireless Wi-Fi networks 108, 118, and 128 provide access to the same unlicensed wireless network. In an example, unlicensed wireless Wi-Fi networks 108, 118, and 128 provide access to different unlicensed wireless networks. In an example, two or more of the unlicensed wireless networks may be the same wireless network. In an example, two or more of the unlicensed wireless networks may be different unlicensed wireless networks. In an example, the unlicensed wireless networks may include IEEE 802.11-based technologies and its progeny (e.g., Wi-Fi), IEEE 802.15-based technologies and its progeny (e.g., Zigbee, Bluetooth, Low-Rate Wireless Personal Area Networks, Wireless HART, MiWi), IEEE 802.16-based technologies (WiMAX), WLAN, near-field communications, and infrared communications.

Figure 2:
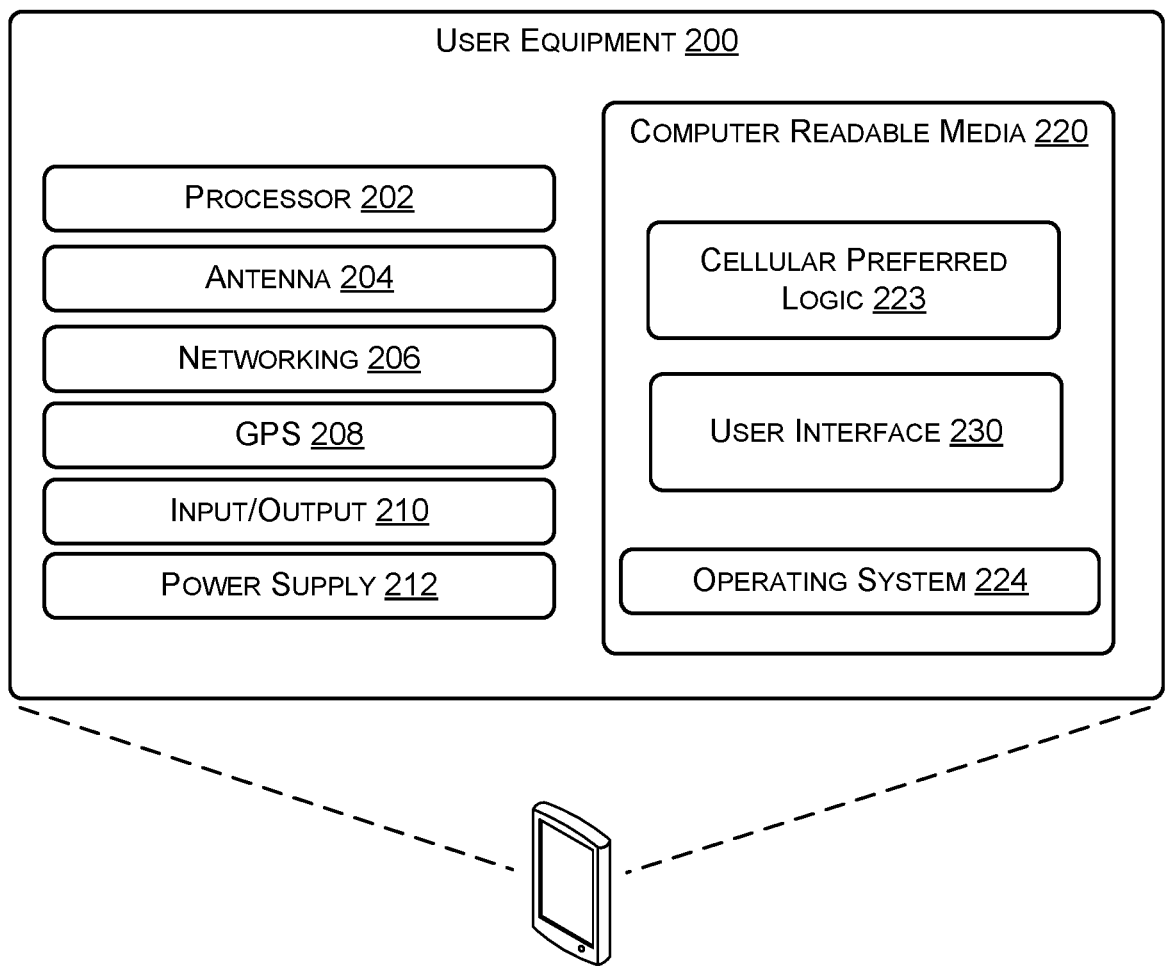
FIG. 2 illustrates example a user equipment. The example user equipment includes various hardware and software components.

FIG. 2 illustrates an example user equipment for use with the disclosed systems and methods. In this example, the user equipment 200 includes a processor 202, an antenna 204, networking component 206, GPS 208, input/output ports 210, power supply 212, and a computer readable media 220. The computer readable media 220 includes cellular preferred logic 223, operating system 224, and user interface 230.

The user equipment 200 includes one or more processors 202. Processor(s) 202 may be any type of processors, including a central processing unit (CPU), a graphics processing unit (GPU), or both CPU and GPU, or other processing unit or component known in the art.

The antenna 204 provides radio frequency (RF) communications with a licensed cellular network, such as an LTE network, a Universal mobile telecommunications systems (UTMS) network, or a GSM network. The networking component 206 may include ports and modules for communicating with the outside world. The networking component 206 includes transceiver ports for local area networks (LANs) and wide area networks (WANs). In one example, the LAN and/or WAN ports provide a wired connection to the Internet. The networking component 206 may also include a wireless communications module that includes one or more wireless transceivers to wirelessly transmit and receive data. For example, the transceivers can include a network interface card (NIC), a network adapter, a LAN adapter, or a physical, virtual, or logical address to connect to various network(s), for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers are not limited to 802.11 ac, but may include one or more modems for engaging in IEEE 802.11-based technologies, IEEE 802.15-based technologies and its progeny (e.g., Zigbee, Bluetooth, Low-Rate Wireless Personal Area Networks, Wireless HART, MiWi), IEEE 802.16-based technologies (WiMAX), WLAN, near-field communications, and infrared communications.

The GPS 208 provides global positioning data for the user equipment. Input/output (I/O) ports 210 is configured for interfacing with the external environment. The I/O ports may include USB, serial, parallel, HDMI, display ports, digital video interface (DVI), Ethernet, and any other ports known to a person of ordinary skill in the art. These input/out ports may collectively be referred to as I/O 210. The I/O ports interface with device(s), such as a keypad, a cursor control, a touch-sensitive display, voice input device, etc., a display, speakers, printers, etc. These ports are well known in the art and need not be discussed at length here.

The user equipment 200 also includes power supply 212 for providing AC and/or DC power for the user equipment. In an example power supply 212 is a battery. In an example, power supply 212 includes an AC adaptor with backup power supply such as a backup battery.

The user equipment 200 also includes computer-readable media 220. As an example, the computer-readable media 220 include a memory (or other storage components) for storing computer executable instructions performing the disclosed systems and methods. The computer readable media also includes the operating system 224. Computer readable media may include any type of memory or storage media for a processor, including RAM, ROM, firmware, flash memory, EEPROM, or other types of memory known to one of ordinary skill in the art. One component of computer readable media 220 is a cellular-preferred logic component 223, which provides the executable code for the cellular preferred logic of the user equipment 200. Tangible computer-readable media can include volatile and nonvolatile, removable and non-removable media implemented in any method or technology for storage of information, such as computer readable instructions, data structures, program modules, or other data. In an example, computer readable media may include hard disk drives for storing the instructions for the cellular-preferred logic 223. Other computer readable media may include magnetic disks, optical disks, or tape, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 200. Any such tangible computer-readable media may be included in user equipment 200.

As previously mentioned, the computer readable media 220 includes the cellular preferred logic component 223 that performs example cellular preferred logic methods based, in part, on a priority order for connection to one or more licensed cellular networks or one or more unlicensed wireless networks. The cellular-preferred logic component 223 includes executable computer instructions that when executed on a processor cause a user equipment to determine whether to connect to a licensed cellular network or to an unlicensed cellular network. In one example, the cellular preferred logic provides a priority order directing a user equipment to connect to a licensed cellular network, if available, and if not available, to an unlicensed wireless network. In an example, the computer readable media also includes a user interface 230 for displaying information to or querying input from, a user of the user equipment 200. The cellular preferred logic may also include computer instructions for updating the priority order.

The user interface 230 includes computer executable code that displays information on a user interface on a display screen of the user equipment. Information for display may include the identification of available licensed cellular networks, identification of available unlicensed wireless networks, current user preference for connection, the ability to override the connection preference, and the ability to change the connection preference. Other information may also be displayed on the user interface of the display screen, including whether to update or override the priority order. The user interface 230 may also include computer executable code that allows the user to select connection preferences or otherwise interact with the user equipment.

The cellular preferred logic component 223 includes instructions that when executed, cause the user equipment 200 to connect to a licensed cellular network, if available, and if not available, cause the user equipment 200 to connect to an unlicensed wireless network if available. In one example, the computer instructions when executed cause the user equipment to measure a signal quality value of available cellular networks. The signal quality value of the licensed cellular network may include, but is not limited to, one or more of the following parameters: RSRP, RSCP, or RSSI. The cellular preferred logic component also includes executable instructions for comparing a measured signal quality value (e.g., RSP, RSCP, or RSSI) to a signal quality threshold. If the measured signal quality value exceeds a signal quality threshold, the user equipment connects (or remains connected) to the licensed cellular network. If the measured signal quality is less than the signal quality threshold, the user equipment attempts to connect to an unlicensed wireless network. In this case, the cellular preferred logic component 223 also includes executable instructions that cause a user equipment to measure and compare the signal quality of the unlicensed wireless network against a signal quality threshold for the unlicensed wireless network. If the measured signal quality exceeds the signal quality threshold of the unlicensed wireless network, the executable instructions of the cellular preferred logic component 223 causes the user equipment to connect to unlicensed wireless network. The cellular preferred logic component 223 also includes executable instructions that cause the user equipment connected to an unlicensed wireless network to measure the signal quality of available licensed cellular networks and connect to a licensed cellular network if the signal quality of the licensed cellular network exceeds a signal quality threshold of the licensed cellular network.

The cellular preferred logic component 223 may also include instructions that permit the user to specify connection preferences for a cellular network. In one example, the priority order preferences for the user equipment may include (1) licensed LTE (or 5G) networks, (2) UMTS networks, and (3) GSM networks. The user may select the preferences to be in any order. In an example, the cellular preferred logic component 223 includes executable instructions that provide a priority order for connecting to a licensed cellular network. In an example, the cellular preferred logic component 223 includes instructions that when executed, attempt to connect the user equipment to networks based on user input. In an example, the cellular preferred logic component 223 includes instructions that when executed, attempt to connect the user equipment to networks, licensed cellular networks or unlicensed wireless networks, depending on the priority order for the user equipment.

The cellular preferred logic component 223 also includes computer executable instructions that cause the user equipment to determine with the user equipment is located in a H-PLMN or V-PLMN network. If located in a V-PLMN network, the executable instructions may cause the user equipment to display information, including the transitioning into roaming to a V-PLMN network, a query to seek user input as to whether the user equipment remains in the V-PLMN network or transitions to an available unlicensed wireless network.

The disclosed systems and methods permit user equipment to prefer to connect to licensed cellular connections, where possible, while transferring a call from a licensed cellular network to an unlicensed wireless network when the signal quality of the licensed cellular connection falls below an acceptable signal quality threshold. In one example, the signal quality threshold is established such that the call maintains adequate quality while connected to the licensed cellular network, and transferring the call to an unlicensed wireless network before the call quality degrades to an unacceptable level.

FIGS. 3-13 illustrate example processes in accordance with implementations of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. According to particular implementations, portions of the processes illustrated in FIGS. 3-13 can be combined with each other.

In certain implementations, portions of the processes illustrated in FIGS. 3-13 can be omitted.

Figure 3:
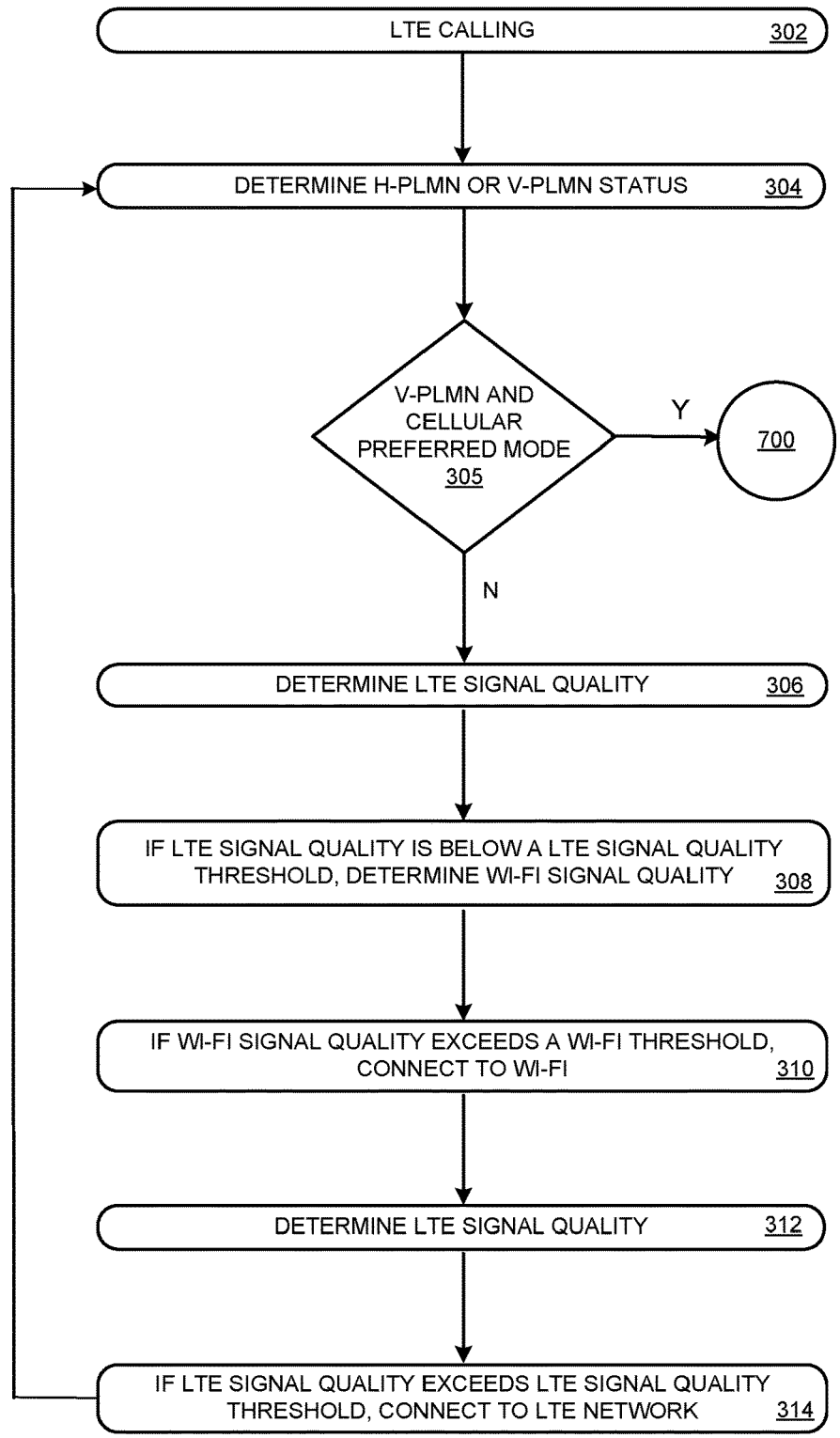
FIG. 3 illustrates an example cellular preferred connection process for a user equipment according to the disclosed systems and methods. In this example, the user equipment may connect to a licensed cellular network such as a LTE network or an unlicensed wireless network such as a Wi-Fi network. The system determines whether the user equipment is connected to a Home Public Land Mobile Network (H-PLMN) or a Visited Public Land Mobile Network (V-PLMN).

FIG. 3 shows an example cellular-preferred process 300 for connecting calls with user equipment such as a cellular telephone. In this example, the user equipment has successfully registered with an IP Multimedia Subsystem (IMS) over an IMS-Access Point Name (APN). The user equipment has received a selection for a cellular preferred connection mode. In one example, a cellular preferred mode may attempt to connect first to a licensed LTE network, if available, second, to an UMTS network, if available, and finally, to a GSM network, if available.

In the example shown in FIG. 3, a user equipment configured for cellular-preferred connection is connected to a licensed LTE network at block 302. A user equipment can connect to various types of licensed cellular networks. In one example, a user equipment connects to a Home Public Land Mobile Number (H-PLMN), a network in which the profile of the subscriber (e.g., user of the user equipment) is maintained. If an H-PLMN network is not available, the user equipment may roam and connect to a Visited Public Land Mobile Network (V-PLMN) network, a network in which a user equipment receives its subscription information from the H-PLMN network. At block 304, the user equipment determines whether the user equipment is connected to a H-PLMN or a V-PLMN network.

Block 305 illustrates steps performed when a user equipment has roamed into a V-PLMN from its home network (H-PLMN). A V-PLMN is a licensed cellular network operated by a carrier different from the carrier of the H-PLMN network. When roaming to a V-PLMN network, a user of a user equipment may incur additional charges for use of a user equipment in the V-PLMN network. A user connected to a V-PLMN with a preference for cellular connections may choose to connect to an unlicensed wireless network to reduce unexpected cellular changes at block 305. For example, in this case, the user equipment may execute the method 700 shown in FIG. 7, allowing the user to override the priority order or update the priority order. Otherwise, a user equipment that is connected to a H-PLMN network or a user equipment that has selected a cellular preferred mode (even when roaming to a V-PLMN) may execute the instructions for block 306 to determine the signal quality of the licensed LTE network.

At block 306, the measured signal quality of the connection with the licensed LTE network may be based on measurements of one or more parameters relating to signal quality. For example, the signal quality may be estimated by calculating an RSRP value, an RSCP value, an RSSI value, or another value relating to the quality of the connection to the licensed cellular network. In an example, the signal quality may be measured based in part, on the type of licensed cellular network. For example, an RSRP value may be calculated for a user equipment connected to an LTE network, an RSCP value may be calculated for a user equipment connected to a UMTS network, and a RSSI value may be calculated for a user equipment connected to a GSM network.

The calculated signal quality may be compared against a licensed cellular signal quality threshold at block 308 to determine when the quality of the call or user experience has sufficiently degraded that the call may be transferred to the unlicensed network. For example, if the signal quality of the licensed cellular network exceeds a first signal quality threshold of the licensed cellular network, the user equipment maintains its cellular connection. Otherwise, if the signal quality of the licensed cellular network is less than a threshold for signal quality of the licensed cellular network at block 308, the user equipment attempts to connect to an unlicensed network.

As part of connecting to an unlicensed Wi-Fi network, user equipment may determine the signal quality of a connection to the unlicensed Wi-Fi network. One parameter for estimating the signal quality of the connection to the unlicensed wireless network is an RSSI value. In one example, if the RSSI value measured at block 310 exceeds a RSSI threshold for the unlicensed wireless network, the user equipment connects to the unlicensed Wi-Fi network at block 310.

Upon connecting to the unlicensed Wi-Fi-network, the user equipment determines another signal quality of the connection with the licensed cellular network at block 312 because the user equipment prefers connecting to a licensed cellular network where possible. If the quality of the connection with the licensed network exceeds a wireless network threshold, the user equipment connection changes from the unlicensed Wi-Fi network to a licensed cellular network at block 314. Control of the method is then passed back to block 304 to determine whether the device is connected to H-PLMN or V-PLMN network.

Figure 4:
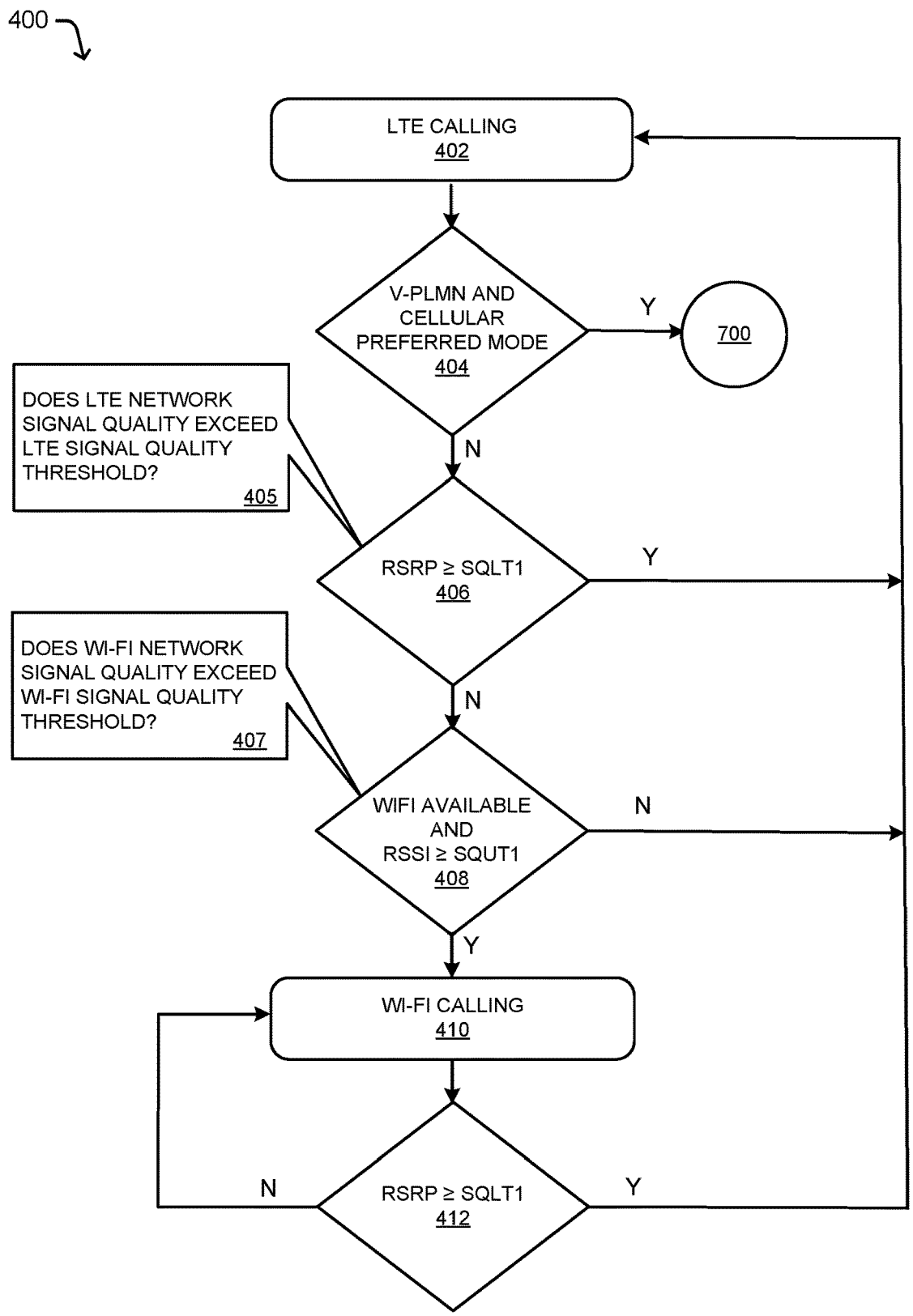
FIG. 4 illustrates an example LTE cellular preferred connection process for a user equipment according to the disclosed systems and methods. In this example, the user equipment connects to a LTE network so long as a value of a LTE signal quality exceeds a non-zero LTE signal quality threshold. The user equipment connects to an unlicensed Wi-Fi network, if available, when a value of the LTE signal quality is below the LTE signal quality threshold and a value of the Wi-Fi signal quality exceeds a Wi-Fi signal quality threshold. After connecting to an unlicensed Wi-Fi network, the user equipment attempts to connect to a licensed LTE cellular network when the value of the LTE signal quality exceeds the non-zero LTE signal quality threshold.

FIG. 4 illustrates an example cellular-preferred process 400 for a user equipment. In this example, the user equipment is registered for LTE (or 5G) calling at block 402. After connection to the licensed cellular network, the user equipment determines if the user equipment is connected to a H-PLMN or a V-PLMN network at block 404. If the user equipment is connected to a V-PLMN network, control is transferred to method 700 shown in FIG. 7. As discussed with respect to FIG. 7, as part of method 700, the user of user equipment may determine if the user equipment should remain connected to the V-PLMN network or should override or update the priority order and connect to an unlicensed wireless network, if available.

If the user equipment is connected to H-PLMN network, and the user equipment is configured in a cellular preferred mode, control passes to block 406 to determine the signal quality of the licensed cellular connection. In the example shown in FIG. 4, RSRP is chosen as the signal quality metric. Block 405 determines whether the network signal quality (e.g., for a LTE or 5G network) exceeds a signal quality threshold. If the measured RSRP value exceeds a signal quality threshold SQLT1 (−115 dBm in an example) at block 406, the signal quality of the connection with the licensed cellular network is considered sufficient for adequate communications, and the user equipment remains connected to the licensed network. Otherwise, if the measured RSRP value does not exceed the signal quality threshold SQLT1, the user equipment attempts to connect to an unlicensed wireless network, if available.

In an example, the signal quality threshold SQLT1 is chosen to be approximately −115 dBm. In another example, the signal quality threshold SQLT1 is chosen to be approximately in the range of −110 dBm to −120 dBm. In an example, the signal quality threshold SQLT1 is chosen to be approximately in the range of −100 dBm to −125 dBm.

When the user equipment attempts to connect to unlicensed network, the signal quality of the connection with the unlicensed network is measured and compared to a signal quality threshold SQUT1 at block 408. In this example, the RSSI value is measured to determine a signal quality of the unlicensed wireless network and compared against a signal quality threshold SQUT1. Block 407 determines whether the Wi-Fi network signal quality exceeds a Wi-Fi signal quality threshold. At block 408, if the measured RSSI value is less than the signal quality threshold SQUT1 (−70 dBm in an example), the user equipment remains connected to the licensed LTE network. Moreover, if the user equipment lost connection with the licensed network (e.g., the LTE or 5G network), the user equipment may continue to register for communication on a licensed network, if available.

In an example, the signal quality threshold SQUT1 is chosen to be approximately −70 dBm. In another example, the signal quality threshold SQUT1 is chosen to be approximately in the range of −60 dBm to −80 dBm. In an example, the signal quality threshold SQUT1 is chosen to be approximately in the range of −50 dBm to −90 dBm.

A measured RSSI value greater than or equal to the signal quality threshold SQUT1 (e.g., −70 dBm in an example) indicates that an unlicensed wireless network is available for connection at block 410. In this case, the user equipment connects to the unlicensed network. Moreover, since the user equipment is in a cellular-preferred mode, the user equipment searches for available licensed networks for connection while the user equipment is connected to the unlicensed wireless network. In one example, the method determines another RSRP value at block 412. If the measured RSRP value is greater than or equal to a signal quality threshold SQUT1, the user equipment connects to the licensed network at block 402. Otherwise, the user equipment remains connected to the unlicensed wireless network.

Figure 5:
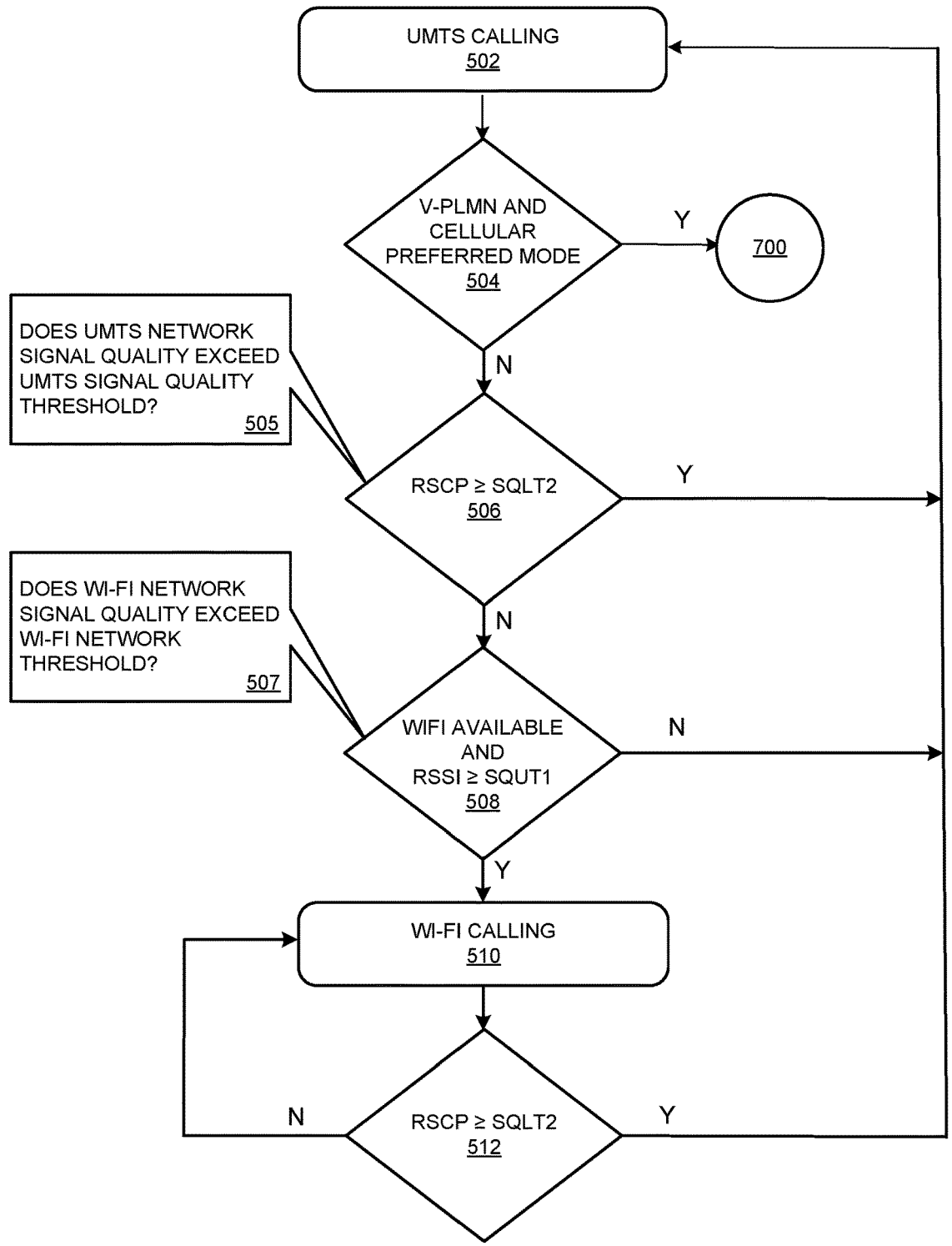
FIG. 5 illustrates an example licensed UMTS cellular preferred connection process for a user equipment according to the disclosed systems and methods. In this example, the user equipment connects to a licensed UMTS network so long as a value of a UMTS signal quality exceeds a non-zero UMTS signal quality threshold. The user equipment connects to an unlicensed Wi-Fi network, if available, when the value of the UMTS signal quality is below the UMTS signal quality threshold and a value of the Wi-Fi signal quality exceeds a Wi-Fi signal quality threshold. After connecting to an unlicensed Wi-Fi network, the user equipment attempts to connect to an UMTS network when the value of the UMTS signal quality exceeds the non-zero UMTS signal quality threshold.

FIG. 5 illustrates an example cellular-preferred process 500 for use in a user equipment. In this example, the user equipment is registered for UMTS calling at block 502. After connection to the licensed cellular network, the user equipment determines if it is connected to a H-PLMN or a V-PLMN network at block 504. If the user equipment is connected to a V-PLMN, control is transferred to method 700 shown in FIG. 7. As discussed with respect to FIG. 7, as part of method 700, the user of user equipment determines if the user equipment should remain connected to the V-PLMN network or should update or override the priority order and connect to an unlicensed wireless network, if available.

If the user equipment is connected to H-PLMN network and the user equipment is configured in a cellular-preferred mode, control passes to block 506 to determine the signal quality of the connection with licensed UMTS cellular connection. In the example shown in FIG. 5, RSCP is chosen as the signal quality metric. Block 505 determines whether the UMTS network signal quality exceeds a UMTS signal quality threshold. In this example, if the measured RSCP value exceeds a signal quality threshold SQLT2 (−115 dBm in an example) at block 506, the signal quality of the licensed cellular network is considered sufficient for adequate communications, and the user equipment remains connected to the licensed UMTS network. Otherwise, if the measured RSCP value does not exceed the signal quality threshold SQLT2, the user equipment attempts to connect to an unlicensed wireless network, if available.

In an example, the signal quality threshold SQLT2 is chosen to be approximately −115 dBm. In another example, the signal quality threshold SQLT2 is chosen to be approximately in the range of −110 dBm to −120 dBm. In an example, the signal quality threshold SQLT2 is chosen to be approximately in the range of −100 dBm to −125 dBm.

When the user equipment attempts to connect to unlicensed network, the signal quality of the connection with the unlicensed network is measured and compared to a threshold at block 508. In this example, the RSSI value is measured to determine a signal quality of the unlicensed wireless network and compared against the signal quality threshold SQUT1. Block 507 determines whether the Wi-Fi network signal quality exceeds a Wi-Fi signal quality threshold. At block 508, if the measured RSSI value is less than the signal quality threshold SQUT1 (−70 dBm in an example), the user equipment remains connected to the licensed UMTS network. Moreover, if the user equipment lost connection with the licensed UMTS network, the user equipment will continue to register for communication on a licensed UMTS network.

As discussed previously, in an example, the signal quality threshold SQUT1 is chosen to be approximately −70 dBm. In another example, the signal quality threshold SQUT1 is chosen to be approximately in the range of −60 dBm to −80 dBm. In an example, the signal quality threshold SQUT1 is chosen to be approximately in the range of −50 dBm to −90 dBm.

A measured RSSI value greater than or equal to the signal quality threshold SQUT1 (−70 dBm in an example) indicates that an unlicensed wireless network is available for connection at block 510. In this case, the user equipment connects to the unlicensed wireless network. Moreover, since the user equipment is in a cellular preferred mode, the user equipment searches for available licensed networks for connection while the user equipment is connected to the unlicensed wireless network. In an example, the method determines another RSCP value at block 512. If the measured RSCP is greater than or equal to the signal quality threshold SQLT2, the user equipment connects to the licensed UMTS network at block 502. Otherwise, the user equipment remains connected to the unlicensed wireless network.

Figure 6:
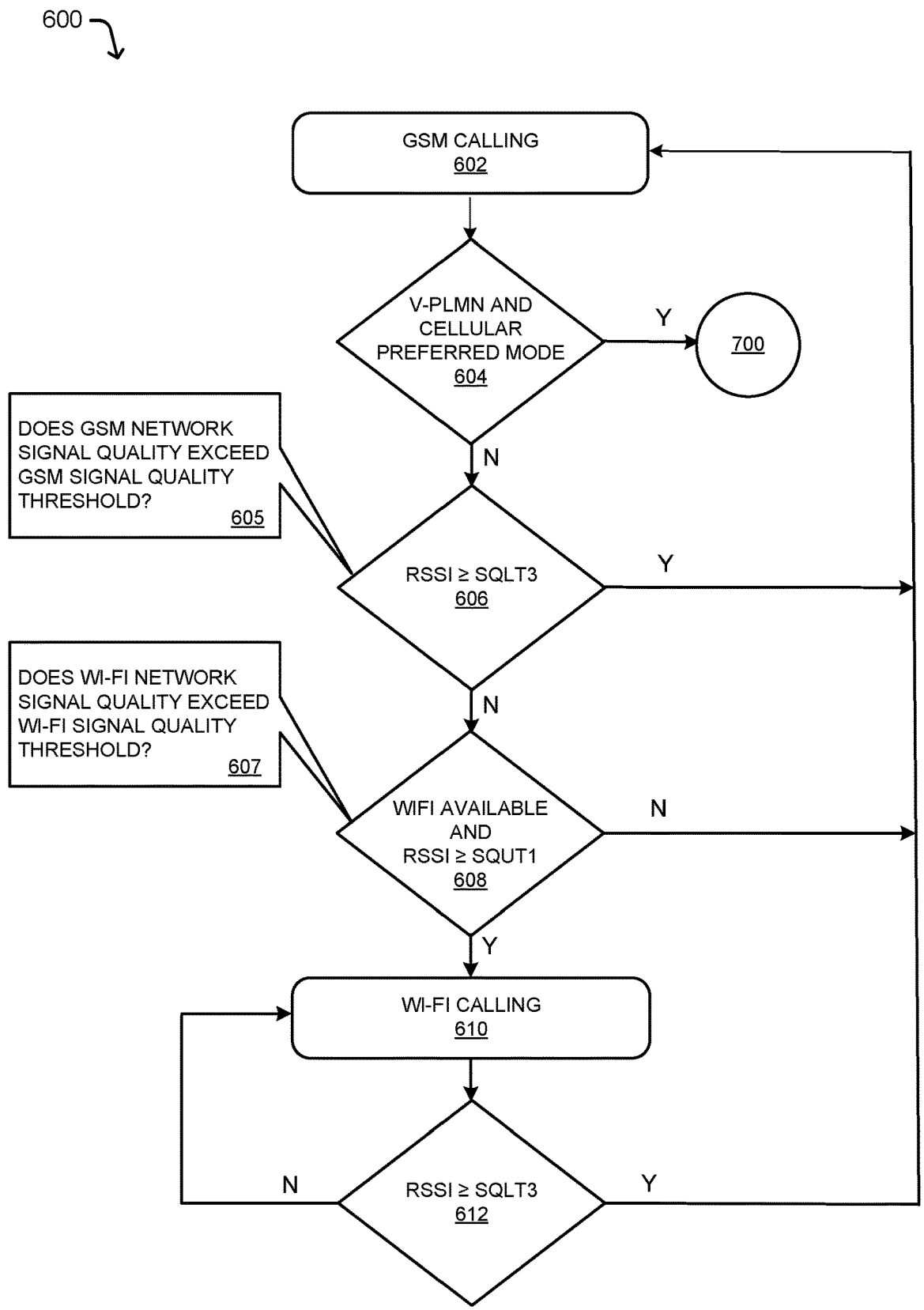
FIG. 6 illustrates an example licensed Global System for Mobile communications (GSM) cellular preferred connection process for a user equipment according to the disclosed systems and methods. In this example, the user equipment connects to a licensed GSM network so long as a value of a GSM signal quality exceeds a non-zero GSM signal quality threshold. The user equipment connects to an unlicensed Wi-Fi network, if available, when the value of the GSM signal quality is below the GSM signal quality threshold and a value of the Wi-Fi signal quality exceeds a Wi-Fi signal quality threshold. After connecting to an unlicensed Wi-Fi network, the user equipment attempts to connect to a licensed GSM network when the value of the GSM signal quality exceeds the non-zero GSM signal quality threshold.

FIG. 6 illustrates an example cellular-preferred process 600 for use in a user equipment. In this example, the user equipment is registered for GSM calling at block 602. After connection to the licensed cellular network, the user equipment determines if it is connected to a H-PLMN or a V-PLMN network at block 604. If the user equipment is connected to a V-PLMN network, control is transferred to process 700 shown in FIG. 7. As discussed with respect to FIG. 7, as part of process 700, the user of user equipment determines if the user equipment should remain connected to the V-PLMN network or should override or update the priority order and connect to an unlicensed wireless network, if available.

If the user equipment is connected to an H-PLMN network and the user equipment is configured in a cellular-preferred mode, control passes to block 606 to determine the signal quality of the licensed GSM cellular connection. In the example shown in FIG. 6, RSSI is chosen as the signal quality metric. Block 605 determines whether the GSM network signal quality exceeds a GSM signal quality threshold. In this example, if the measured RSSI value of the licensed GSM network exceeds a signal quality threshold SQLT3 (−98 dBm in an example) at block 606, the signal quality of the licensed GSM cellular network is considered sufficient for adequate communications, and the user equipment remains connected to the licensed GSM network. Otherwise, if the measured RSSI value of the licensed GSM network does not exceed the signal quality threshold SQLT3, the user equipment attempts to connect to an unlicensed wireless network, if available.

In an example, the signal quality threshold SQLT3 is chosen to be approximately −98 dBm. In another example, the signal quality threshold SQLT3 is chosen to be approximately in the range of −90 dBm to −110 dBm. In an example, the signal quality threshold SQLT3 is chosen to be approximately in the range of −80 dBm to −120 dBm.

When the user equipment attempts to connect to an unlicensed wireless network, the signal quality of the connection with the unlicensed network is measured and compared to a threshold at block 608. Block 607 determines whether the Wi-Fi network signal quality exceeds a Wi-Fi signal quality threshold. In this example, the RSSI value is measured to determine a signal quality of the connection with the unlicensed wireless network and compared against a signal quality threshold SQUT1 for the unlicensed wireless network. In an example, the RSSI threshold for the unlicensed wireless network may be selected as −70 dBm. At block 508, if the measured RSSI value is less than the signal quality threshold SQUT1, the user equipment remains connected to the licensed GSM network. Moreover, if the user equipment lost connection with the licensed GSM network, the user equipment will continue to register for communication on a licensed GSM network.

As discussed previously, in an example, the signal quality threshold SQUT1 is chosen to be approximately −70 dBm. In another example, the signal quality threshold SQUT1 is chosen to be approximately in the range of −60 dBm to −80 dBm. In an example, the signal quality threshold SQUT1 is chosen to be approximately in the range of −50 dBm to −90 dBm.

A measured RSSI value greater than or equal to the signal quality threshold SQUT1 (−70 dBm in an example) at block 608 indicates that an unlicensed wireless network is available for connection. In this case, the user equipment connects to the unlicensed wireless network at block 610. Moreover, since the user equipment is in a cellular-preferred mode, the user equipment searches for available licensed networks for connection while the user equipment is connected to the unlicensed wireless network. In one example, another RSSI value is calculated at block 612. If the measured RSSI value is greater than or equal to the signal quality threshold SQUT1, the user equipment connects to the licensed GSM network at block 602. Otherwise, the user equipment remains connected to the unlicensed wireless network.

Figure 7:
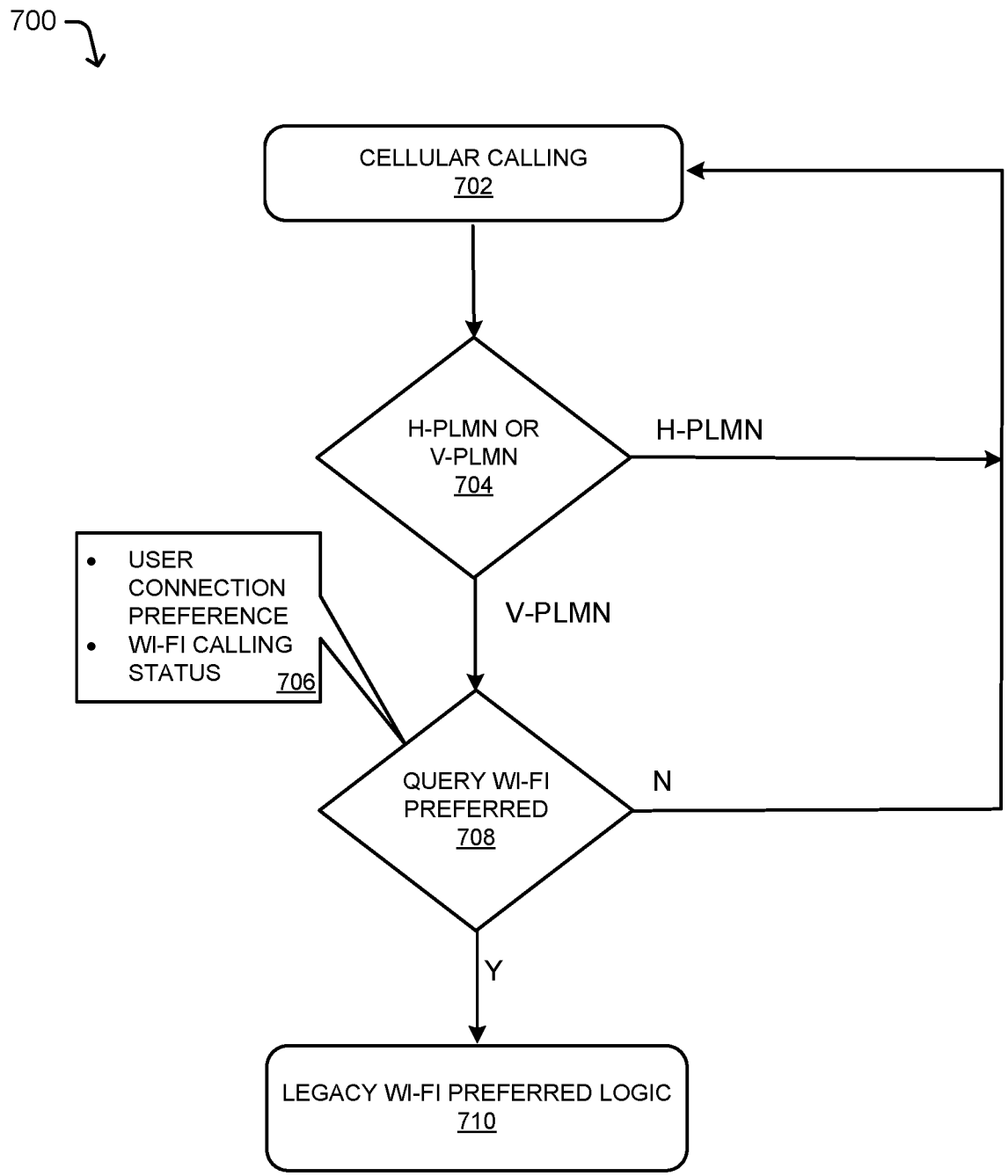
FIG. 7 illustrates an example algorithm for a cellular preferred user equipment transitioning from a H-PLMN licensed cellular network to a V-PLMN licensed cellular network. In this example, the user equipment may select to connect (or continue to connect) with the licensed V-PLMN cellular network or to connect to an available unlicensed Wi-Fi network.

FIG. 7 illustrates an example cellular-preferred configuration process 700 for a user equipment roaming from a H-PLMN to a V-PLMN network. In this example, a user equipment is in cellular-preferred priority order configuration in block 702. At block 704, the user equipment determines whether the user equipment is located in a H-PLMN or V-PLMN network. User equipment located in a H-PMLN is network is generally not roaming and continues to operate in the cellular-preferred mode in block 702. User equipment located in a V-PMLN network has roamed away from the H-PLMN network of the user equipment. When in a V-PLMN network, the user equipment may be subject to additional roaming charges.

Upon determining that the user equipment is connected to a V-PLMN network, the user equipment may be provided with information at block 706 regarding the current connection preference and the availability of an unlicensed wireless network. The information may include associated roaming charges. In one example, a message is displayed on a user interface screen of the user equipment. In one example, the information displayed in the message on the user interface screen may include the user calling preference (e.g., cellular preferred), the availability of unlicensed wireless network, and an indication that the user is roaming onto a V-PLMN network.

In response to information displayed on the user interface of the user equipment, the user interface may display a query message regarding user preferences at block 708. In one example, a user may override or update the priority order for the cellular preferred configuration when roaming to a V-PLMN network by selecting to connect to an unlicensed wireless network. Upon selection of connecting to an unlicensed wireless network, a user equipment may remain in a legacy Wi-Fi preferred configuration (block 710). In this configuration, based in part on the priority order, the user equipment prefers an unlicensed Wi-Fi connection so long as the Wi-Fi signal strength is above a signal quality threshold of the Wi-Fi network.

Figure 8:
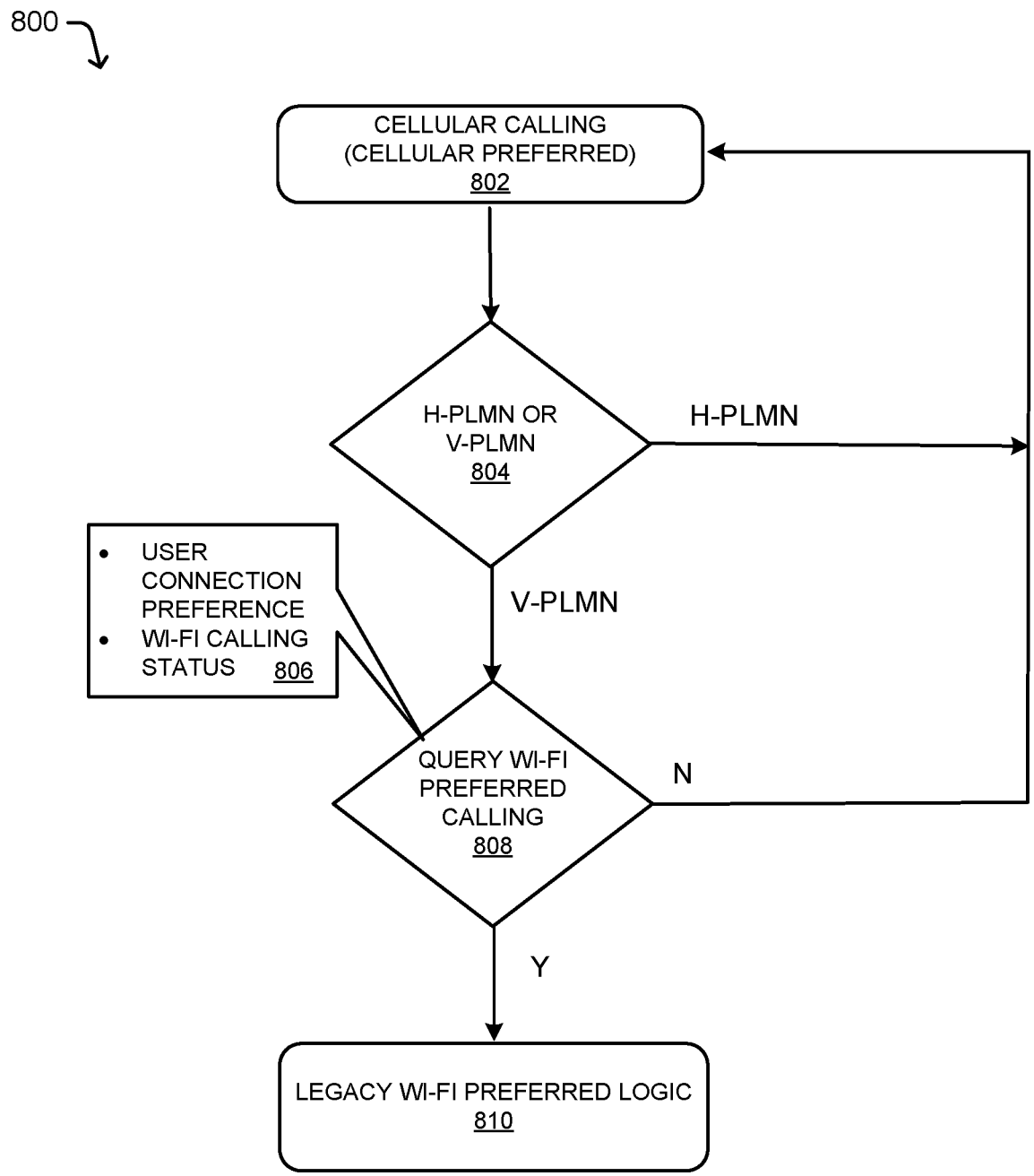
FIG. 8 illustrates an example algorithm for a cellular preferred user equipment transitioning from a V-PLMN licensed cellular network to a H-PLMN licensed cellular network. In this example, the user equipment connects to an available H-PLMN network in its cellular preferred connection. If a V-PLMN network, but not a H-PLMN network is available, the user equipment may choose to connect (or continue to connect) to a V-PLMN network or to an available unlicensed Wi-Fi network.

FIG. 8 illustrates an example process 800 for transitioning a user equipment configured with cellular-preferred logic away from a V-PLMN to a H-PLMN network. The user equipment shown in FIG. 8 is operating in a cellular-preferred mode at block 802. In block 804, a determination is made as to whether the user equipment is connected to an H-PLMN or a V-PLMN network. A user equipment connected to an H-PLMN network at block 804 continues to operate in cellular preferred mode (see block 802) as shown by the arrow directed to the right with the label "H-PLMN." If a user equipment is determined to be connected to a V-PLMN network, control passes to block 808 and information is presented to the user through the user interface of the user equipment at block 806 alerting the user that the user equipment is connected to a V-PLMN.

In an example, the current user connection preference or priority order and the Wi-Fi calling status may be displayed for the user on the user interface of the user equipment. Information related to roaming charges may be displayed in an example. Information about the location of the user equipment may be displayed. In one example, the user via the user interface selects to maintain a cellular-preferred connection and control is passed to block 802. In an example, the user selects Wi-Fi calling status, and control is passed to block 810, in which the user equipment changes to a Wi-Fi preferred logic configuration. In an example, a user selecting Wi-Fi calling status may update the priority order to a Wi-Fi priority order. In an example, a user selecting a Wi-Fi calling status may override the priority order, thereby preferring Wi-Fi calling while maintaining a cellular-preferred connection.

Figure 9:
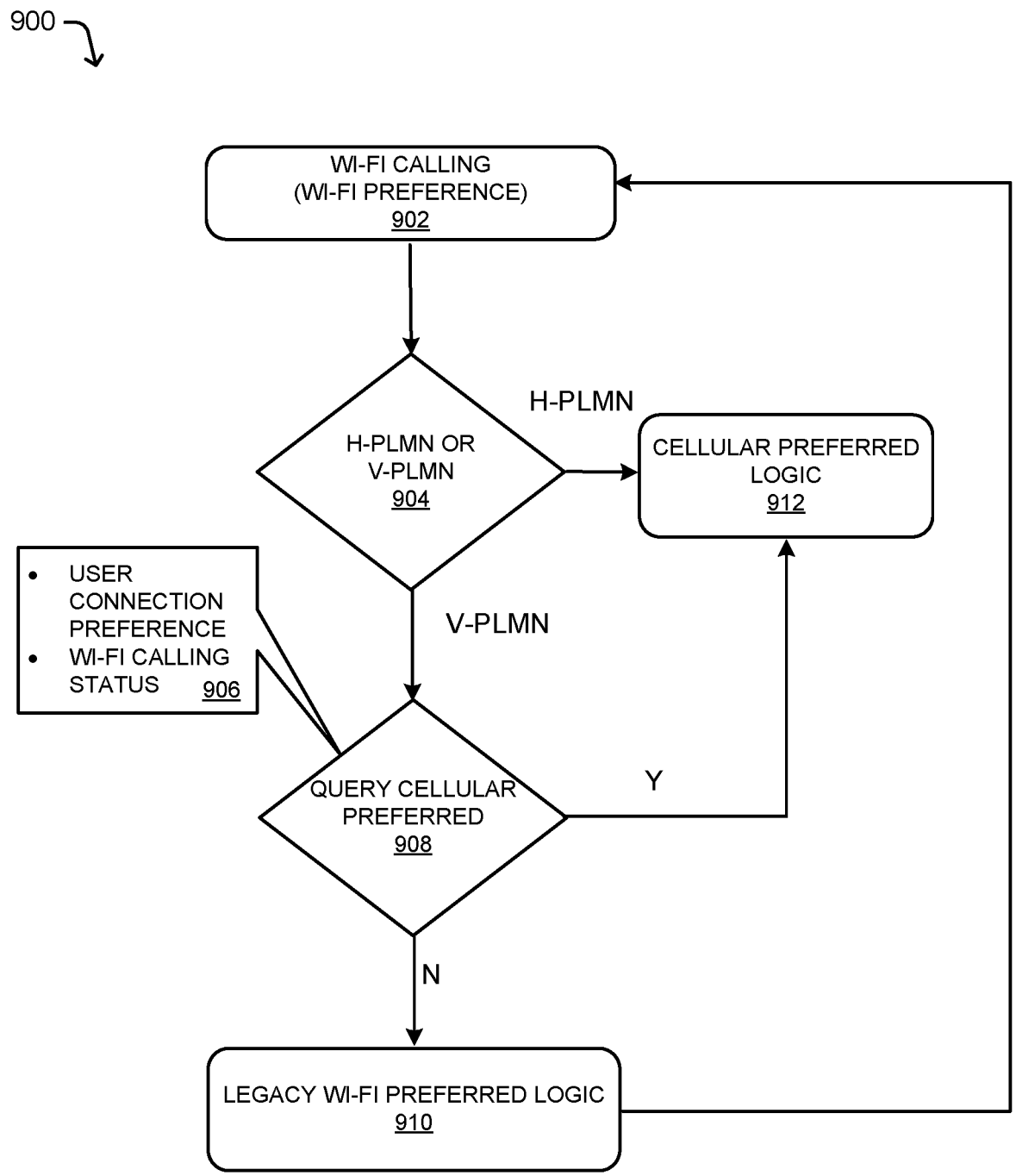
FIG. 9 illustrates an example algorithm for a Wi-Fi preferred user equipment transitioning from a V-PLMN licensed network to a H-PLMN licensed network. In this example, the availability of a V-PLMN causes the user equipment to select to connect to (or continue its connection with) a V-PLMN network or maintains its Wi-Fi connection. The user equipment will connect to an available H-PLMN network.

FIG. 9 illustrates an example process 900 of a user equipment in Wi-Fi calling mode transitioning into cellular coverage. In an example, the Wi-Fi calling mode updates a priority order for connecting to unlicensed networks. The cellular coverage in this example may further include a transition from V-PLMN to H-PLMN network coverage. In block 902, the user equipment in an unlicensed Wi-Fi calling preference mode is connected to an unlicensed wireless network. In block 904, a determination is made as to whether a V-PLMN network or a H-PLMN network available for connection. In an example, if a H-PLMN network is available, the user equipment may connect to the H-PLMN network and change its calling preference to cellular-preferred. In an example, if a H-PLMN network is available, information may be presented in a user interface of the user equipment regarding the current calling mode preference and the availability of the H-PLMN network. Through the user interface, the user may select to remain connected to Wi-Fi network or chose to connect to the H-PLMN network.

If a V-PLMN network is determined to be available at block 904, the user equipment may remain in the Wi-Fi calling preference mode, thereby not modifying the priority order for connecting networks to the user device. In another example, if the user equipment is located within the coverage of a V-PLMN network, information is presented in block 906 to the user to facilitate selection of a calling mode preference. In an example, information is presented in a user interface of the user equipment regarding the current calling mode preference and the availability of the V-PLMN network. Information regarding roaming charges may also be presented to the user. Information regarding the location of the user equipment may be displayed. The user may select the type of connection (cellular-preferred or Wi-Fi preferred) through the user interface of the user equipment, and the user equipment will attempt to connect to the selected network. In an example, selecting the type of connection updates the priority order of the user equipment. In an example, selecting the type of network connection overrides the priority order of the user equipment with respect to the current network selections.

If the user selects a cellular-preferred mode in block 908, control is passed to block 912. The user equipment in block 908 operates in a cellular-preferred mode as previously described. If, however, the user selects to continue in a Wi-Fi preferred mode, control is passed to block 910. The user equipment in block 910 operates in a Wi-Fi preferred mode as previously discussed. In an example, the priority order for the user equipment is updated or overridden for based on the selection of a Wi-Fi preferred mode.

Figure 10:
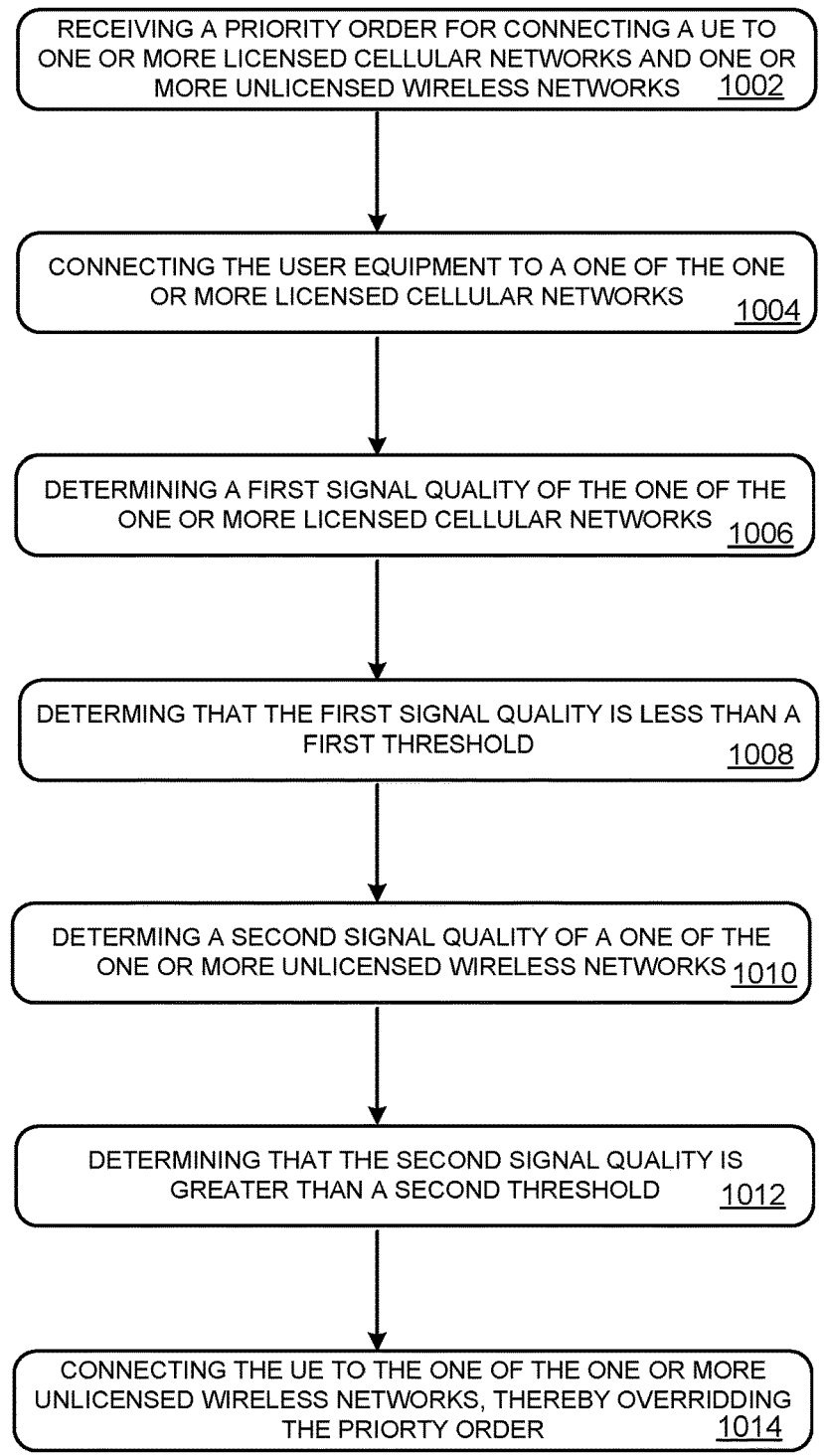
FIG. 10 illustrates an example process for connecting a user equipment to one or more licensed cellular networks or to one or more unlicensed wireless networks. In this example, a user equipment configured in a cellular preferred mode with a priority order to connect to a licensed cellular network before an unlicensed wireless network. The user equipment remains connected to a licensed cellular network until the signal strength of the connection with the licensed cellular network is less than a signal strength threshold. As the signal strength of the licensed cellular network connection falls below the signal strength threshold, the user equipment connects to an unlicensed wireless network, if available.

FIG. 10 depicts an example process 1000 for connecting a user equipment to one or more licensed cellular networks or to one or more unlicensed wireless networks. The method begins at block 1002 that depicts receiving a priority order for connecting a user equipment to one or more licensed cellular networks or to one or more unlicensed wireless networks. The priority order configures the user equipment to connect to any one of the one or more licensed cellular networks before connecting to any one of the one or more unlicensed wireless networks. The user equipment may be connected to one of the one or more licensed cellular networks at block 1004. The signal quality of the connection with the licensed cellular network is determined at block 1006. The signal quality of the connection may be determined using any of the disclosed methods and systems, including analyzing RSRP, RSCP, RSSI, and other suitable signal parameters.

At block 1008, the signal quality is compared to a threshold. In one example, the threshold signal quality for RSRP may be chose to be −115 dBm. If the signal quality (e.g., RSRP) is determined to be less than the selected threshold (e.g., −115 dBm) at block 1008, the signal quality of one of one or more unlicensed wireless networks is determined at block 1010. In one example, the signal quality of the unlicensed wireless network may be determined based on the RSSI value. At block 1012, the signal quality is compared to the signal quality threshold. If the signal quality of the unlicensed wireless network (e.g., RSSI) exceeds a signal quality threshold (e.g., −70 dBm) at block 1012, the user equipment may be connected to the one of the one or more unlicensed wireless networks at block 1014. In one example, the priority order of the user equipment remains is overridden and remains unchanged as the user equipment connects to the unlicensed wireless network. In another example, the priority order of the user equipment is updated to be in a Wi-Fi preferred mode and the user equipment connects to an unlicensed network.

Figure 11:
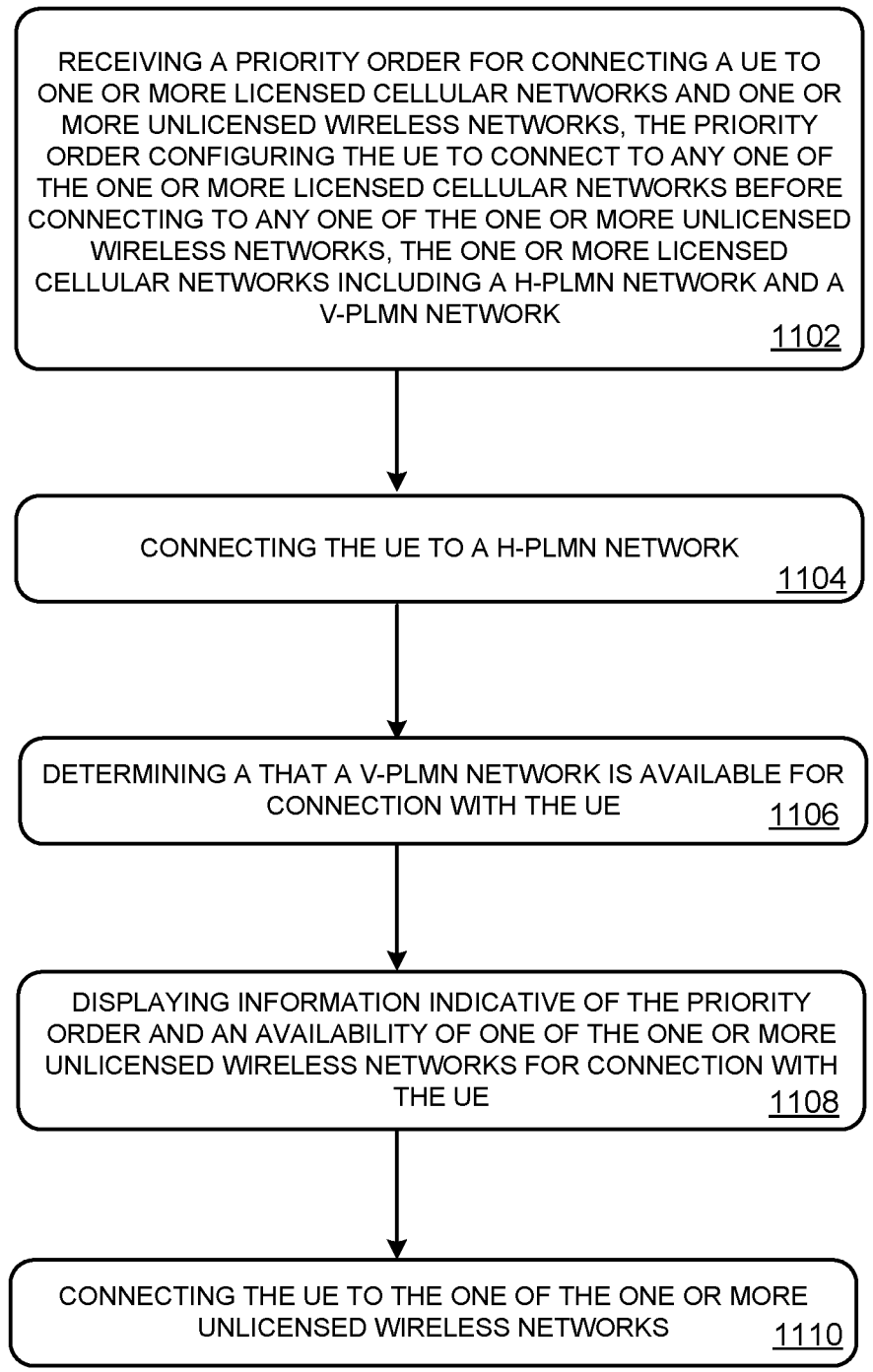
FIG. 11 illustrates an example process for connecting a user equipment to one or more licensed cellular networks or to one or more unlicensed wireless networks. In this example, the user equipment connects to an H-PLMN network, and before connecting to a V-PLMN network, information is displayed on the user equipment indicating that current connection and information indicative of connecting to the V-PLMN network. The user of the user equipment may select to connect to an unlicensed wireless network, if available, rather than to the V-PLMN as according to the priority order. Thereafter, the user equipment may connect to the unlicensed wireless network, thereby overriding or updating the priority order.

FIG. 11 depicts an example process 1100 for connecting a user equipment to one or more licensed cellular networks or to one or more unlicensed wireless networks. Process 1100 begins at block 1102 by receiving a receiving a priority order for connecting a user equipment to one or more licensed cellular networks or to one or more unlicensed wireless networks. The priority order configures the user equipment to connect to any one of the one or more licensed cellular networks before connecting to any one of the one or more unlicensed wireless networks. The one or more licensed cellular networks includes a Home Public Land Mobile Number (H-PLMN) network and a Visited Public Land Mobile Number (V-PLMN) network.

The user equipment is connected to a H-PLMN network at block 1104. As the user equipment moves, the user equipment may move away from a H-PLMN network into the coverage of a V-PLMN network. The user equipment in one example may measure a signal quality of the H-PLMN network. If the signal quality of the H-PLMN network is less than a signal quality threshold, the user equipment may determine that a V-PLMN network is available connection with the user equipment at block 1106. In an example, the user equipment may determine the availability of a V-PLMN network after the signal quality of the connection with the H-PLMN network degrades to a level that triggers a handover of the connection from a H-PLMN network to a V-PLMN network.

Even though a V-PLMN network is available for connection, a user may not want to connect to the V-PLMN for various reasons, including additional roaming charges. In one example, information indicative of the priority order is displayed on the user interface of the user equipment at block 1108. Additionally, information may also be displayed on the user interface of the user equipment, including the availability of one of the one or more unlicensed wireless networks for connection with the user equipment. Other information may be displayed including whether to update or override the priority order. Finally, at block 1110, the user equipment connects to the one of the one or more unlicensed wireless networks.

Figure 12:
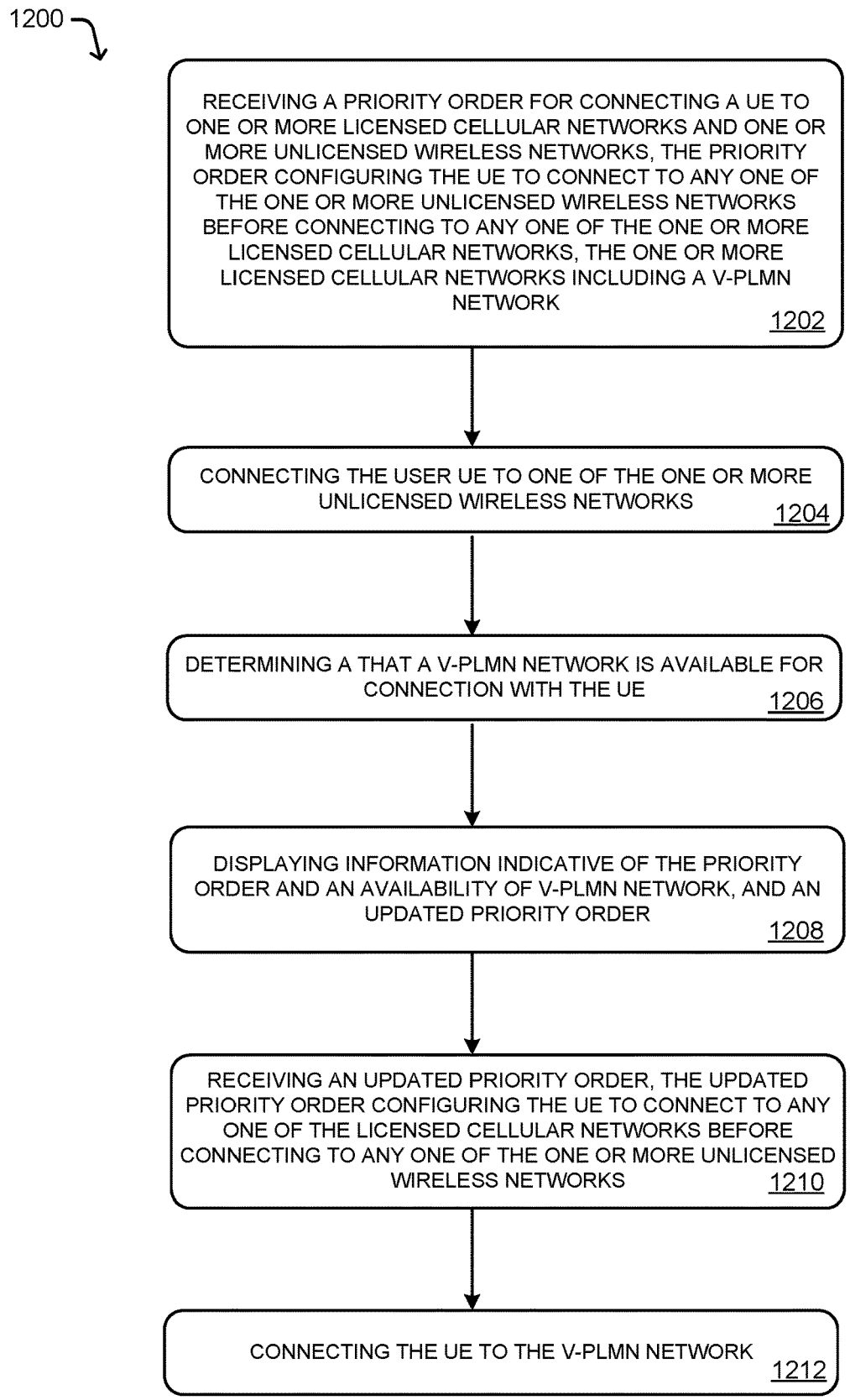
FIG. 12 illustrates an example process for configuring a network connection for a user equipment. In this example, the user equipment is configured in a Wi-Fi preferred configuration, and the user equipment is connected to an unlicensed wireless network. If the user equipment determines that a V-PLMN is available, information relating to the priority order and the availability of the V-PLMN network may be displayed on the user interface of the display screen of the user equipment. Information about updating or overriding the priority order may also be displayed. After receiving an updated priority order, the user equipment may connect to the V-PLMN. In another example, the user may choose to override the priority order and maintain the user equipment in a Wi-Fi preferred mode before connecting to the V-PLMN.

FIG. 12 depicts an example process 1200 for configuring a network connection for a user equipment. The process begins at block 1202 by receiving a priority order for connecting a user equipment to one or more licensed cellular networks or to one or more unlicensed wireless networks. The priority order configures the user equipment to connect to any one of the one or more unlicensed wireless networks before connecting to any one of the one or more licensed cellular networks. The one or more licensed cellular networks in one example include a Visited Public Land Mobile Number (V-PLMN) network.

At block 1204, the user equipment connects to one of the one or more unlicensed wireless networks. In an example, the process may also include determining that a H-PLMN network is available for connection. If an H-PLMN network is available for connection, the priority order of the user equipment may be updated to be in a cellular-preferred configuration and the user equipment may connect to the H-PLMN. In the example shown in FIG. 12, a V-PLMN network is determined to be available for connection at block 1206. Before transitioning to a V-PLMN network from an unlicensed wireless network, information indicative of the priority order is displayed on the user interface of the user equipment at block 1208. Other information may be displayed on the user interface of the user equipment at block 1208, including an availability of the V-PLMN network and an updated priority order. After displaying the information on the user interface of the user device, the user interface may display a query for the user to indicate whether to connect to the V-PLMN.

In response to the user selecting to connect to the V-PLMN network at block the user equipment receives an updated priority order for connections at block 1210. The updated priority order in one example configures the user equipment to connect to any one of the licensed cellular networks before connecting to any one of the one or more unlicensed wireless networks. In another example, the priority order does not change, but instead, the priority order may be overridden such that the user equipment will connect to a V-PLMN network when configured in a Wi-Fi preferred mode. Finally, at block 1212 the user equipment is connected to the V-PLMN network.

Figure 13:
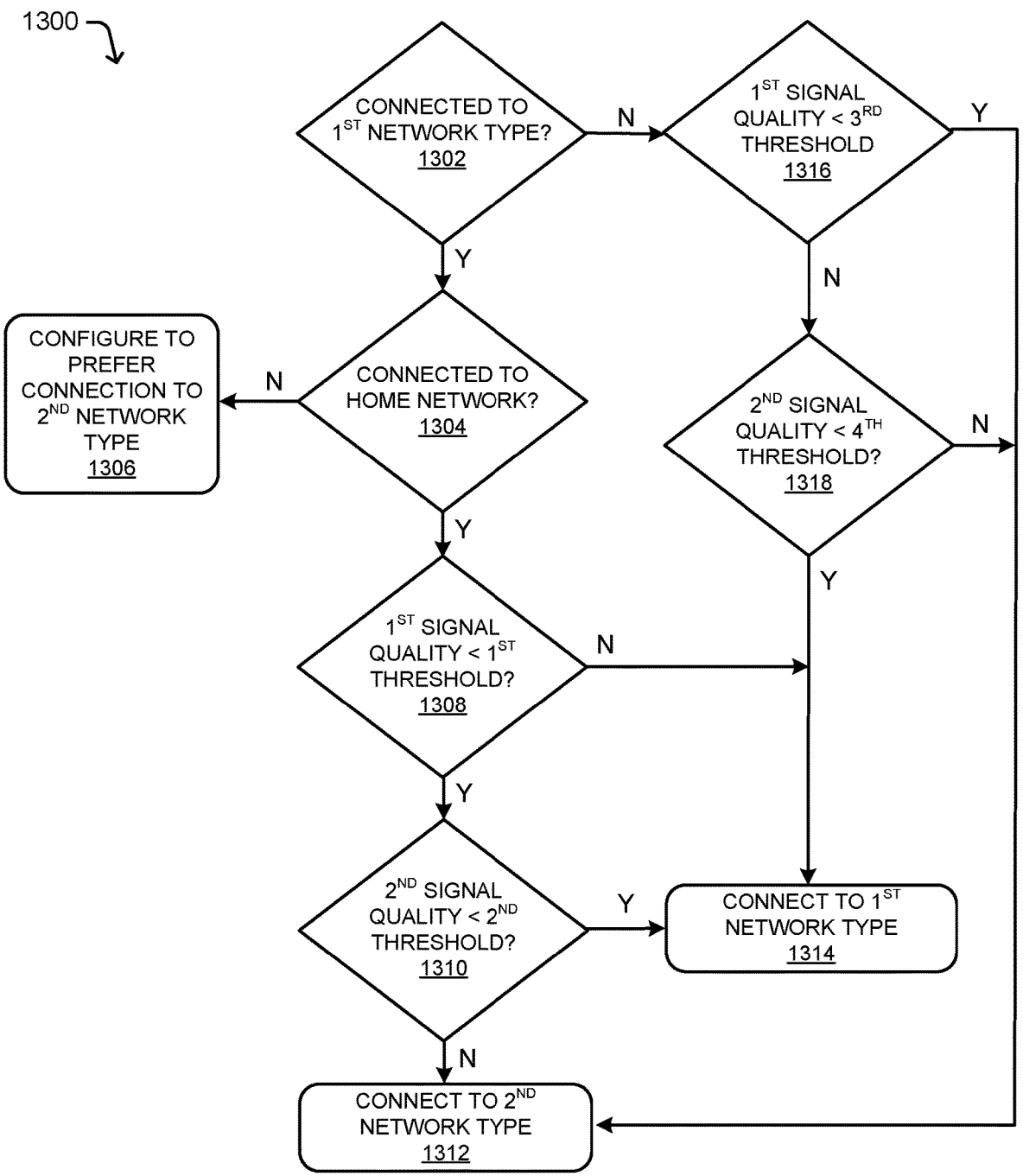
FIG. 13 shows an example process 1300 for connecting to a first network type or a second network type when a preference for connecting to the first network type is implemented.

FIG. 13 shows an example process 1300 for connecting to a first network type or a second network type when a preference for connecting to the first network type is implemented. In some implementations, process 1300 is performed by a user equipment. In various examples, the first network type includes a licensed wireless network. The licensed wireless network can be, for instance, any of a 2G wireless network, a 3G wireless network, a 4G wireless network (e.g., an LTE network), a 5G wireless network, any other type of licensed wireless network discussed herein, and the like. In various implementations, the second network type includes an unlicensed wireless network. The unlicensed wireless network can be, for instance, any of a Wi-Fi network, any other type of unlicensed wireless network discussed herein, and the like.

At 1302, the process 1300 includes determining whether there is a connection to the first network type. In particular implementations, 1302 may include determining whether the user equipment is currently connected to a licensed wireless network.

If a connection to the first network type is determined to exist at 1302, the process 1300 proceeds to 1304. At 1304, the process 1300 includes determining whether the connection to the first network type is a connection to a home network. In particular implementations, 1304 may include determining whether the user equipment is currently camped on the home network. In various instances, the home network may be a H-PLMN network.

If the connection is determined to not be to the home network at 1304 (for example, the user equipment is roaming in a visited network, such as a V-PLMN), the process 1300 proceeds to 1306. At 1306, the process 1300 includes configuring to prefer a connection to the second network type. In particular implementations, the user equipment is configured to prefer a connection to the first network type at 1302 and 1304, but is configured to prefer a connection to the second network type at 1306. In some examples, the user equipment is configured to prefer a connection to the second network type automatically. In some cases, the user equipment is configured to prefer a connection to the second network type in response to (i) outputting a user interface element (e.g., on a display screen) that provides a user with the option to select a preference for a connection to the second network type and (ii) receiving an input from the user via the user interface element.

In particular implementations, a logic associated with a preference for connecting to the second network type is performed at 1306. For instance, if the second network type is associated with a Wi-Fi network, the user equipment may implement a Wi-Fi preferred logic, such as 710 described with reference to FIG. 7. In some examples, a toast message will be output on the user equipment the first time the preference for connecting to the second network type is implemented.

In some implementations in which the user equipment is configured to prefer a connection with the second network type, the user equipment may later connect to a home network. For instance, the user equipment may enter a coverage area associated with the home network. In response to connecting to the home network, the user equipment may be configured to prefer a connection to the first network type and process 1300 can be repeated. Upon changing the preference or connection of the user equipment (whether to a preference for or connection to the first network type or to a preference for or a connection to the second network type), a notification can be output by the user equipment indicating the changed preference. The notification can be any of a visual message output on a screen of the user equipment, an audio signal, and the like.

If the connection is determined to be the home network at 1304, the process 1300 proceeds to 1308. At 1308, the process 1300 includes determining whether a first signal quality is less than a first threshold. The first signal quality may be associated with the connection to the first network type. In some cases, the first signal quality is an RSRP of a licensed wireless network, although any signal quality metric may be used (e.g., RSRQ, RSSI, etc.). In certain examples in which the first network type is associated with an LTE network or a 5G network, the first threshold may be −117 dBm. In particular examples in which the first network type is associated with a 3G network, the first threshold may be −110 dBm. In some examples in which the first network type is associated with a 2G network, the first threshold may be −104 dBm. In various implementations, the first threshold may be within a range of −100 to −120 dBm.

If the first signal quality is determined to be less than the first threshold at 1308, the process 1300 proceeds to 1310. At 1310, the process 1300 includes determining whether a second signal quality is less than a second threshold. The second signal quality may be associated with the second network type. For instance, the second signal quality may be a signal quality associated with an available wireless connection between the user equipment and an unlicensed wireless network. In particular implementations, the second signal quality is an RSSI of the unlicensed wireless network. In certain examples in which the second network type is associated with a Wi-Fi network, the second threshold may be −70 dBm. In various implementations, the second threshold may be within a range of −60 dBm to −80 dBm.

If, at 1310, the second signal quality is determined to not be less than the second threshold (i.e., the second signal quality is equal to or greater than the second threshold), the process proceeds to 1312. At 1312, a connection with the second network type is established. For instance, the user equipment may connect to the unlicensed wireless network, and may transmit and receive data via the unlicensed wireless network. In some examples in which the user equipment is participating in voice services, the user equipment may implement voice over Wi-Fi at 1312, even when cellular calling is preferred.

On the other hand, if the second signal quality is determined to be less than the second threshold at 1310, the process 1300 proceeds to 1314. At 1314, a connection with the first network type is established. In some implementations, the user equipment remains connected to the first network type. According to some examples, the user equipment connects to a licensed wireless network, such as a cellular network, and may transmit and receive data via the licensed wireless network. In some examples in which the user equipment is participating in voice services and the first network is an LTE network or 5G network, the user equipment may implement voice over LTE (or NR) at 1314.

Returning back to 1302, if the connection to the first network type is determined to not be present (e.g., the user equipment is connected to the second network type rather than the first network type), the process 1300 proceeds to

1316. At 1316, the process 1300 includes determining whether the first signal quality is less than a third threshold. In various implementations, the third threshold can be different than the first threshold. For instance, in examples in which the first network type is associated with the LTE network or 5G network and the first threshold is −117 dBm, the third threshold may be −112 dBm. In some examples in which the first network type is associated with a 3G network and the first threshold is −110 dBm, the third threshold may be −100 dBm. In particular implementations in which the first network type is associated with a 2G network and the first threshold is −105 dBm, the third threshold may be −95 dBm.

The mismatch between the first threshold and the third threshold may prevent a ping pong scenario, in which the user equipment rapidly switches between the first and second network types when any of the apparent signal qualities of the first and second network types change slightly. In some cases, the mismatch between the first threshold and the third threshold may be 2-10 dBm. For instance, the mismatch can be 5 dBm.

If the first signal strength is determined to be less than the third threshold at 1316, the process 1300 proceeds to 1312. As described above, 1312 includes connecting to the second network type.

On the other hand, if at 1316 the first signal strength is determined to not be less than the third threshold (i.e., the first signal strength is greater than or equal to the third threshold), the process 1300 proceeds to 1318. At 1318, the process includes determining whether the second signal quality is less than a fourth threshold. The fourth threshold may be the same or different than the second threshold. In some instances, the fourth threshold may be 2-10 dBm greater than the second threshold. For instance, the fourth threshold may be 5 dBm greater than the second threshold.

If, at 1318, the second signal quality is determined to be less than the fourth threshold, the process 1300 proceeds to 1314. As described above, 1314 includes connecting to the first network type.

Although not illustrated, in some implementations, the process 1300 can be repeated at least once upon executing 1312 or 1314. In particular examples, the process 1300 can be performed periodically. In some examples, 1300 can be performed in response to configuring the user device to prefer the connection to the first network type.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
   receiving a priority order for connecting a user equipment to one or more licensed cellular networks or to one or more unlicensed wireless networks, the priority order configuring the user equipment to connect to any one of the one or more licensed cellular networks before connecting to any one of the one or more unlicensed wireless networks;
   connecting the user equipment to one of the one or more licensed cellular networks to form a connection to the one of the one or more licensed cellular networks;
   determining a first signal quality of the one of the one or more licensed cellular networks;
   determining that the first signal quality is less than a first threshold, the first threshold being a threshold signal quality better than a drop threshold at which the connection to the one of the one or more licensed cellular is degraded to a level where the call will be dropped;
   determining a second signal quality of one of the one or more unlicensed wireless networks;
   determining that the second signal quality is greater than a second threshold; and
   connecting, at least partly in response to the determining that the first signal quality is less than the first threshold and the determining that the second signal quality is greater than the second threshold, the user equipment to the one of the one or more unlicensed wireless networks, thereby overriding the priority order.

2. The method of claim 1, further comprising:
   determining a third signal quality of a second one of the one or more licensed cellular networks;
   determining that the third signal quality of the second one of the one or more licensed cellular networks is greater than or equal to the first threshold; and
   connecting the user equipment to the second one of the one or more licensed cellular networks.

3. The method of claim 1, wherein the one or more licensed cellular networks include at least one of a Fifth Generation (5G) network, a Long-Term Evolution (LTE) network, a Universal Mobile Telecommunications System (UTMS) network, a Global System for Mobile communications (GSM) network, a Home Public Land Mobile Number (H-PLMN) network, or a Visited Public Land Mobile Number (V-PLMN) network.

4. The method of claim 1, wherein the one or more unlicensed wireless networks include at least one of an 802.11 network, a Wi-Fi network, a WiMAX network, a WLAN, a Bluetooth network, a near field communication network, or an infrared network.

5. The method of claim 1, wherein the first signal quality includes at least one of a reference signal received power (RSRP), a reference signal received quality (RSRQ), a received signal code power (RSCP), or a relative received signal strength (RSSI).

6. A method comprising:
   receiving a priority order for connecting a user equipment to one or more licensed cellular networks or to one or more unlicensed wireless networks, the priority order configuring the user equipment to connect to any one of the one or more licensed cellular networks before connecting to any one of the one or more unlicensed wireless networks, the one or more licensed cellular networks including a Home Public Land Mobile Number (H-PLMN) network and a Visited Public Land Mobile Number (V-PLMN) network;
   connecting the user equipment to the H-PLMN network to form a connection to the H-PLMN network;
   determining a H-PLMN signal quality of the H-PLMN network;
   determining that the H-PLMN signal quality is less than a first threshold;
   determining that the V-PLMN network is available for connection with the user equipment;
   displaying, on the user equipment and at least partially in response to the determining that the H-PLMN signal quality is less than a first threshold and the determining that the V-PLMN network is available for connection with the user equipment, information indicative of the priority order and an availability of one of the one or more unlicensed wireless networks for connection with the user equipment; and connecting the user equipment to the one of the one or more unlicensed wireless networks, thereby overriding the priority order.

7. The method of claim 6, further comprising:
updating the priority order as an updated priority order configuring the user equipment to connect to any one of the one or more unlicensed wireless networks before connecting to any one of the one or more licensed cellular networks.

8. The method of claim 6, wherein connecting the user equipment to the one of the one or more unlicensed wireless networks includes:
determining a first signal quality of one of the one or more the unlicensed wireless networks; and
determining that the first signal quality exceeds a first threshold.

9. The method of claim 6, further comprising:
receiving an indication of a preference to select the one of the one or more unlicensed wireless networks for connection with the user equipment; and
connecting the user equipment to the one of the one or more unlicensed wireless networks based at least in part on the indication.

10. The method of claim 9, further comprising:
determining that the H-PLMN network is available for connection with the user equipment; and
connecting the user equipment to the H-PLMN network.

11. A user equipment for connecting to one or more licensed cellular networks or to one or more unlicensed wireless networks, the user equipment comprising:
one or more processors; and
one or more non-transitory computer-readable media storing instructions that when executed by the one or more processors, cause the user equipment to:
receive a priority order for connecting the user equipment to the one or more licensed cellular networks or to the one or more unlicensed wireless networks, the priority order configuring the user equipment to connect to any one of the one or more licensed cellular networks before connecting to any one of the one or more unlicensed wireless networks;
connect the user equipment to one of the one or more licensed cellular networks;
determine a first signal quality of the one of the one or more licensed cellular networks;
determine that the first signal quality is less than a first threshold the first threshold being a threshold signal quality better than a drop threshold at which the licensed cellular connection is degraded to a level where the call will be dropped;
determine a second signal quality of one of the one or more unlicensed wireless networks;
determine that the second signal quality is greater than a second threshold; and
connect, at least partly in response to the determining that the first signal quality is less than the first threshold and the determining that the second signal quality is greater than the second threshold, the user equipment to the one of the one or more unlicensed wireless networks, thereby overriding the priority order.

12. The user equipment of claim 11, wherein the instructions further cause the user equipment to:
determine a third signal quality of a second one of the one or more licensed cellular networks;
determine that the third signal quality of the second one of the one or more licensed cellular networks is greater than or equal to the first threshold; and
connect the user equipment to the second one of the one or more licensed cellular networks.

13. The user equipment of claim 11, wherein the one or more licensed cellular networks include at least one of a Fifth Generation (5G) network, a Long-Term Evolution (LTE) network, a Universal Mobile Telecommunications System (UTMS) network, a Global System for Mobile communications (GSM) network, a Home Public Land Mobile Number (H-PLMN) network, or a Visited Public Land Mobile Number (V-PLMN) network.

14. The user equipment of claim 11, wherein the one or more unlicensed wireless networks include at least one of an 802.11 network, a Wi-Fi network, a WiMAX network, a WLAN, a Bluetooth network, a near field communication network, or an infrared network.

15. The user equipment of claim 11, wherein the first signal quality includes at least one of a reference signal received power (RSRP), a reference signal received quality (RSRQ), a received signal code power (RSCP), or a relative received signal strength (RSSI).

16. The user equipment of claim 11, wherein the priority order is a first priority order, and wherein the instructions further cause the user equipment to:
receive a second priority order for connecting the user equipment to the one or more licensed cellular networks or to the one or more unlicensed wireless networks, the second priority order configuring the user equipment to connect to any one of the one or more licensed cellular networks before connecting to any one of the one or more unlicensed wireless networks, the one or more licensed cellular networks including a Home Public Land Mobile Number (H-PLMN) network and a Visited Public Land Mobile Number (V-PLMN) network;
connect the user equipment to the H-PLMN network;
determine that the V-PLMN network is available for connection with the user equipment;
display, on the user equipment, information indicative of the second priority order and an availability of one of the one or more unlicensed wireless networks for connection with the user equipment; and
connect the user equipment to the one of the one or more unlicensed wireless networks.

17. The user equipment of claim 16, wherein the instructions further cause the user equipment to:
receive an indication of at least one of a first selection of a priority order confirmation or a second selection to update the priority order.

18. The user equipment of claim 11, wherein the instructions further cause the user equipment to:
update the priority order as an updated priority order configuring the user equipment to connect to any one of the one or more unlicensed wireless networks before connecting to any one of the one or more licensed cellular networks.

19. The user equipment of claim 11, wherein the instructions further cause the user equipment to:
determine that the one or more licensed cellular networks and the one or more unlicensed wireless networks are available to the user equipment at a same time; and
connect the user equipment to the one or more licensed cellular networks and the one or more unlicensed wireless networks to increase a bandwidth available to the user equipment.

20. The user equipment of claim 11, wherein the one or more licensed cellular networks include a Visited Public Land Mobile Number (V-PLMN) network, and wherein the instructions further cause the user equipment to:
- determine that a Home Public Land Mobile Number (H-PLMN) network is not available;
- present, based at least in part on determining that the H-PLMN is not available, a first indication on a display of the user equipment to change the priority order; and
- receive a second indication of an updated priority order configuring the user equipment to connect to any one of the one or more unlicensed wireless networks before connecting to any one of the one or more licensed cellular networks.

* * * * *